(12) United States Patent
Mittelstadt et al.

(10) Patent No.: US 10,909,122 B2
(45) Date of Patent: Feb. 2, 2021

(54) USING MODIFIED BLOCKCHAIN CONCEPTS TO GUARANTEE NO TUPLE LOSS AND/OR NO TUPLE CORRUPTION

(71) Applicant: International Business Machines Corporation, Armonk, NY (US)

(72) Inventors: Roger A. Mittelstadt, Byron, MN (US); Rafal P. Konik, Oronoco, MN (US); Jessica R. Eidem, Rochester, MN (US); Jingdong Sun, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 159 days.

(21) Appl. No.: 16/186,324

(22) Filed: Nov. 9, 2018

(65) Prior Publication Data

US 2020/0151271 A1 May 14, 2020

(51) Int. Cl.
*G06F 16/00* (2019.01)
*G06F 16/2455* (2019.01)
*H04L 9/06* (2006.01)
*G06F 16/22* (2019.01)
*G06F 16/23* (2019.01)

(52) U.S. Cl.
CPC .... *G06F 16/24568* (2019.01); *G06F 16/2255* (2019.01); *G06F 16/2365* (2019.01); *H04L 9/0637* (2013.01); *H04L 2209/38* (2013.01)

(58) Field of Classification Search
CPC .......... G06F 16/2255; G06F 16/2365; G06F 16/24568; H04L 2209/38; H04L 9/0637
See application file for complete search history.

(56) References Cited

U.S. PATENT DOCUMENTS 7,355,992 B2   4/2008   Jones et al.
8,023,513 B2   9/2011   Chen et al.
9,674,249 B1*  6/2017   Kekre ..................... H04L 65/60
(Continued)

OTHER PUBLICATIONS

Mariani et al., "Novel Opportunities for Tuple-based Coordination: XPath, the Blockchain, and Stream Processing", 4 pages, downloaded from <https://pdfs.semanticscholar.org/1a7f/b55191bd51c2b524bef889c048e5dc38b5bd.pdf> on Oct. 1, 2018.

(Continued)

*Primary Examiner* — Diedra McQuitery
(74) *Attorney, Agent, or Firm* — Matthew J. Bussan

(57) ABSTRACT

Method, system, and computer program product are provided to guarantee no tuple loss and/or corruption in a real-time data streaming environment. In some embodiments, a stream of tuples is sent from an entry operator to downstream operator(s), and, at the entry operator, a mark is placed on each tuple in the stream of tuples. In an embodiment where the stream of tuples includes first, second, and subsequent tuple(s), for example, the mark may comprise a tuple-unique number and a tuple-data hash of data contained in the tuple, and the mark on the second and each subsequent tuple may further comprise a link-back hash associated with the immediately preceding tuple in the stream of tuples. In some embodiments, the link-back hash is used to check whether a tuple is lost or received out of order, and the tuple-data hash is used to check whether a received tuple is corrupt.

16 Claims, 11 Drawing Sheets

(56) References Cited

U.S. PATENT DOCUMENTS

| | | | |
|---|---|---|---|
| 9,678,837 B1* | 6/2017 | Cook | G06F 16/24568 |
| 2009/0067551 A1* | 3/2009 | Chen | H04L 47/10 |
| | | | 375/340 |
| 2014/0304549 A1 | 10/2014 | Hsu et al. | |
| 2016/0087759 A1 | 3/2016 | Hsu et al. | |
| 2016/0286254 A1* | 9/2016 | Hirose | G11B 27/3036 |
| 2017/0091756 A1 | 3/2017 | Stern et al. | |
| 2017/0364698 A1* | 12/2017 | Goldfarb | G06F 16/9024 |
| 2018/0114218 A1 | 4/2018 | Konik et al. | |
| 2018/0374173 A1* | 12/2018 | Chen | H04L 9/3236 |
| 2019/0068562 A1* | 2/2019 | Iyer | H04L 9/3271 |
| 2020/0073980 A1* | 3/2020 | Lundberg | G06F 16/2255 |

OTHER PUBLICATIONS

Boudguiga et al., "Towards Better Availability and Accountability for IoT Updates by means of a Blockchain", 5 pages, downloaded from <https://hal.archives-ouvertes.fr/hal-01516350/document> on Oct. 1, 2018.

Unknown, "The Transmission Control Protocol (TCP): Lecture 1", 7 pages, downloaded from <http://reeves.csc.ncsu.edu/Classes/csc573/tcp1.pdf> on Oct. 1, 2018.

Pass et al., "Hybrid Consensus: Efficient Consensus in the Permissionless Model", 62 pages, downloaded from <https://pdfs.semanticscholar.org/4e3b/3d71117d1f391025a3917c7ceafe1d1be54e.pdf?_ga=2.102906627.2079903726.1541019853-1697377367.1531421681> on Oct. 1, 2018.

Kaufmann et al., "High Performance Packet Processing with FlexNIC", 13 pages, downloaded from <https://docplayer.net/15055066-High-performance-packet-processing-with-flexnic.html> on Oct. 1, 2018.

Liu et al., "Sequence Pattern Query Processing over Out-of-Order Event Streams", IEEE 25th International Conference on Data Engineering, 2009, pp. 784-795.

Kulkarni et al., "Twitter Heron: Stream Processing at Scale", Proceedings of the 2015 ACM SIGMOD International Conferenct on Management of Data, 2015, pp. 239-250.

Unknown, "Developing stream processing applications with consistent regions", 4 pages, printed from <https://www.ibm.com/support/knowledgecenter/en/SSCRJU_4.3.0/com.ibm.streams.dev.doc/doc/consistentregions.html> on Oct. 31, 2018.

* cited by examiner

USING MODIFIED BLOCKCHAIN CONCEPTS TO GUARANTEE NO TUPLE LOSS AND/OR NO TUPLE CORRUPTION

BACKGROUND

1. Field of the Invention

The present invention relates in general to the field of stream computing. More particularly, the present invention relates to using modified blockchain concepts in a stream computing application to guarantee no tuple loss and/or no tuple corruption.

2. Background of the Related Art

In stream computing applications, there are frequently requirements that data flowing through connections should not be lost, or, in other words, the tuple guarantees delivery. In a real-time data streaming process environment, guaranteed tuple delivery is generally accomplished by a "wait-for-acknowledgement" process that utilizes communication between an upstream operator and a downstream operator. That is, when sending a tuple from one operator to another operator through a series of other operators, the sending operator will wait until acknowledgement from the last downstream operator (i.e., the last downstream operator acknowledges receipt of the tuple) before sending another tuple. This "wait-for-acknowledgement" process is substantially less efficient than no-wait processes and adversely affects real-time data processing.

SUMMARY

Embodiments of the present disclosure include a method, system, and computer program product to guarantee no tuple loss and/or no tuple corruption in a real-time data streaming environment. In one or more embodiments, a stream of tuples is sent from an entry operator to one or more downstream operators and, at the entry operator, a mark is placed on each tuple in the stream of tuples. In an embodiment where the stream of tuples includes a sequence of a first tuple, followed by a second tuple, followed by one or more subsequent tuples, for example, the mark may comprise a tuple-unique number and a tuple-data hash of data contained in the tuple, and on the second tuple and each of the one or more subsequent tuples, the mark may further comprise a link-back hash associated with the immediately preceding tuple in the stream of tuples. In one or more embodiments, the link-back hash is used to check whether a tuple is lost or received out of order. In one or more embodiments, the tuple-data hash is used to check whether a received tuple is corrupt.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
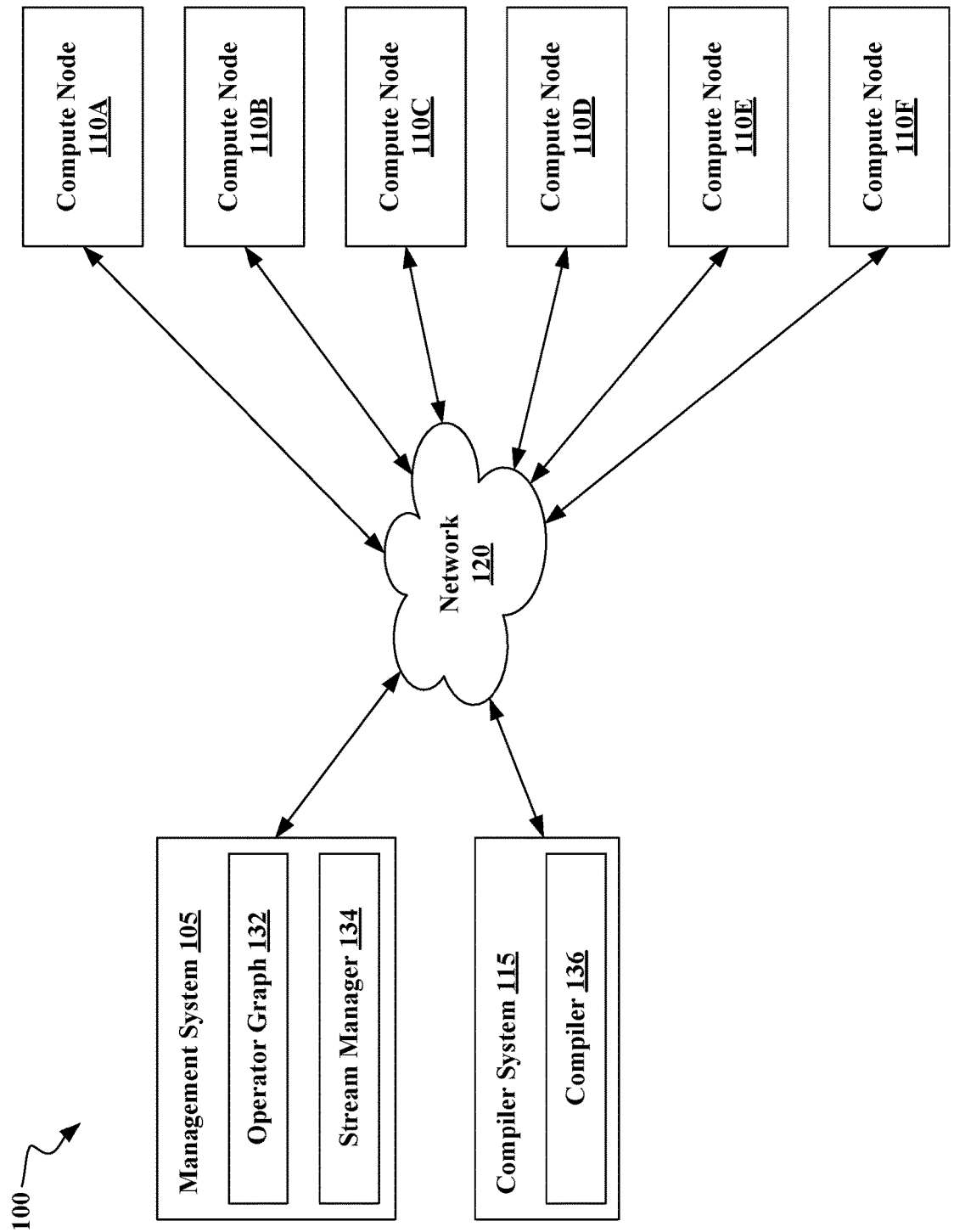
FIG. 1 is a block diagram illustrating a computing infrastructure configured to execute a stream computing application, according to one or more embodiments.

While computer databases have become extremely sophisticated, the computing demands placed on database systems have also increased at a rapid pace. Conventional database systems are typically configured to separate the process of storing data from accessing, manipulating or using data stored in the database. More specifically, conventional databases use a model where data is first stored, then indexed, and finally queried. However, this model cannot meet the performance requirements of some real-time applications. For example, the rate at which a conventional database system can receive and store incoming data limits how much data can be processed or otherwise evaluated. This, in turn, can limit the ability of database applications to process large amounts of data in real-time.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in nanoseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each one of which contains one or more processing modules (i.e., operators). These processing elements can also be replicated on multiple nodes with load balancing among them. Operators in a stream computing application can be fused together to form a processing element that is executable. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

Another advantage of stream computing is that processing elements can be quickly moved into and out of the operator graph. Additionally, a processing element can contain a plurality of fused operators that are encapsulated within a single process running on a compute node. By fusing multiple operators together in a single process, these operators may be able to communicate with one another very efficiently, relative to a configuration where each operator is running in a separate process on the same compute node or a different compute node.

In accordance with one or more embodiments, streaming data is to be processed by a plurality of processing elements and an operator graph of the plurality of processing elements may be established. Generally, the operator graph defines at least one execution path between the processing elements in the plurality of processing elements. In accordance with one or more embodiments, an entry operator places a "mark" on each tuple of streaming data to be processed by the plurality of processing elements within a consistent region (e.g., 602 in FIG. 6, described below) or other region that guarantees no lost tuples and/or guarantees no corrupt tuples.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples, as well as other data formats (e.g., data marked up as XML documents). In the context of tuples, a stream may be considered a pseudo-infinite sequence of tuples.

Tuples are received and output by processing elements. A tuple corresponding with a particular entity, i.e., a particular piece of data, received by a processing element, however, is generally not considered to be the same tuple that is output downstream, even if it corresponds with the same entity or data. Typically, the output tuple is changed in some way by the processing element. An attribute or metadata may be added, deleted, or changed. However, it is not required that the output tuple be changed in some way. Generally, a particular tuple output by a processing element may not be considered the same tuple as a corresponding input tuple even if the input tuple is not changed by the processing element.

Further, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, one or more embodiments of the present invention may be configured to operate in a clustered environment with a standard database processing application.

Embodiments of the present disclosure include a method, system, and computer program product to guarantee no tuple loss and/or no tuple corruption in a real-time data streaming environment. In one or more embodiments, a stream of tuples is sent from an entry operator to one or more downstream operators and, at the entry operator, a mark is placed on each tuple in the stream of tuples. In an embodiment where the stream of tuples includes a sequence of a first tuple, followed by a second tuple, followed by one or more subsequent tuples, for example, the mark may comprise a tuple-unique number and a tuple-data hash of data contained in the tuple, and on the second tuple and each of the one or more subsequent tuples, the mark may further comprise a link-back hash associated with the immediately preceding tuple in the stream of tuples. In one or more embodiments, the link-back hash is used to check whether a tuple is lost or received out of order. In one or more embodiments, the tuple-data hash is used to check whether a received tuple is corrupt.

A "hash" or "hash function", such as the secure hash algorithms (SHA256 and SHA512), is a well-defined procedure or mathematical function that turns some kind of data into a relatively small integer. A good hash function will be deterministic, meaning the two identical or equivalent inputs will generate the same hash value. In accordance with one or more embodiments, if the link-back hash within the mark on a received tuple_n+1 is different than a calculated hash of the immediately preceding tuple_n, then the tuple_n+1 was received out of order (e.g., one or more tuples in the stream of tuples between tuple_n and tuple_n+1 may have been "lost"). In accordance with one or more embodiments, if the tuple-data hash within the mark on a received tuple is different than a recalculated hash of data contained in the received tuple, then the received tuple has been altered in some way (e.g., the received tuple is "corrupt") and should not be trusted.

In accordance with one or more embodiments, an upstream operator sending a tuple does not need to wait for acknowledgement before sending another tuple. An "at-least once" tuple delivery process, in accordance with one or more embodiments, guarantees tuple delivery and, in a succeeding case (e.g., in a case where a tuple is not lost or corrupt, which will occur most of the time), is as efficient as conventional real-time data processing (i.e., no-wait processes, where tuples could get lost or arrive in a corrupted state). In accordance with one or more embodiments, only in a non-succeeding case (e.g., in a case where a tuple is lost or arrives in a corrupted state), will the downstream operator request the upstream operator to re-send a tuple.

Hence, in accordance with one or more embodiments, the upstream operator will not need to wait for acknowledgement from the downstream operator for the tuple status. Instead, the upstream operator can keep sending tuples, but the upstream operator is dependent on the downstream operator to request a re-send of a tuple if needed.

Blockchain techniques can be modified, in accordance with one or more embodiments, for implementation in the context of stream applications to:

1. Guarantee no lost tuples—"at-least-once" tuple delivery;
2. Guarantee tuples are processed by sequence (if requested); and/or
3. Check for and recognize corruption to the tuple (if requested).

In "at-least-once" tuple delivery, each tuple in a stream of tuples is guaranteed to be delivered at least once to a downstream operator.

In accordance with one or more embodiments, modified blockchain concepts are used to mark tuples that are going through a consistent region (e.g., 602 in FIG. 6, described below) or other region that guarantees no lost tuples and/or guarantees no corrupt tuples.

The entry operator, in accordance with one or more embodiments, will put a "mark" on each tuple. In accordance with one or more embodiments, the "mark" placed on each tuple may be implemented using modified blockchain technology. In blockchain technology, each block in a blockchain includes a block header containing a "Prev_Hash" (a hash pointer that points to the address of the previous block and contains the hash of the previous block), a "Timestamp", a "Tx_Root" (Merkle root, i.e., the hash of all the hashes of all the transactions in the block), and a "Nonce". For example, in accordance with one or more embodiments, the "mark" placed on each tuple by the entry operator may include a link-back hash (a link to the immediately preceding tuple, e.g., a hash of the concatenation of a timestamp, sequence number, or other unique number within the "mark" on the immediately preceding tuple and data contained in the immediately preceding tuple), a tuple-unique number (e.g., timestamp, sequence number, or other unique number), and a tuple-data hash (e.g., Merkle root of data contained in the tuple). In accordance with one or more embodiments, the "mark" of a tuple, once set, will not change in the lifecycle of the tuple.

In accordance with one or more embodiments, as the tuples arrive at the downstream operator, the downstream operator will process each tuple subject to an order processing operation (e.g., 1012 in FIGS. 10 and 11, described below) and/or an integrity processing operation (e.g., 1016 in FIGS. 10 and 12, described below). For example, in an order processing operation, in accordance with one or more embodiments, the downstream operator will check if any tuples are out of order or lost based on the "mark" on each tuple. For example, the downstream operator may receive a tuple_n and subsequently receive a tuple_n+1. The downstream operator may determine if the tuple_n+1 is out of order or was preceded in the stream of tuples by a lost tuple by calculating a hash of the tuple_n (e.g., a hash of the concatenation of a timestamp, sequence number, or other unique number within the "mark" on the tuple_n and data contained in the tuple_n), and comparing the calculated hash of the tuple_n and the link-back hash within the mark on the tuple_n+1.

If the tuple arrived by sequence at the downstream operator (i.e., the tuple was not received out of order—this is a succeeding case, and will occur most of the time), the downstream operator can be sure that the tuple was not preceded in the stream of tuples by a lost tuple. In this case, the tuple can be processed without waiting (subject to an integrity processing operation, if requested). For example, the downstream operator may receive a tuple_n and subsequently receive a tuple_n+1. The downstream operator may determine that the tuple_n+1 arrived by sequence at the downstream operator by calculating a hash of the tuple_n (i.e., assume in this example that tuple_n arrived by sequence at the downstream operator and, consequently, was processed without waiting by the downstream operator), comparing the calculated hash of the tuple_n and the link-back hash within the mark on the tuple_n+1, and finding a match between the calculated hash of tuple_n and the link-back hash within the mark on the tuple_n+1. In this case (i.e., where the downstream operator determines that tuple_n+1 arrived by sequence at the downstream operator), the tuple_n+1 can be processed without waiting by the downstream operator (subject to an integrity processing operation, if requested).

In an integrity processing operation, in accordance with one or more embodiments, the downstream operator will check whether the tuple is corrupt based on the "mark" on each tuple. For example, the downstream operator may verify that a received tuple is not corrupt by recalculating the hash of data contained in the received tuple, comparing the recalculated hash of data contained in the received tuple and the tuple-data hash within the mark on the received tuple, and finding a match between the recalculated hash of data contained in the received tuple and the tuple-data hash within the mark on the received tuple.

In accordance with one or more embodiments in which order processing is requested, if the downstream operator does not receive a tuple (there is a gap in the sequence of tuples, e.g., the downstream operator receives tuple_1 and subsequently receives tuple_3 but does not receive tuple_2) within a certain time period (pre-defined and configurable) and/or within a certain buffer limit, the downstream operator will assume the tuple (tuple_2) is lost, send a request to the upstream operator to re-send the lost tuple (tuple_2), and hold all following tuple flow (i.e., post-gap tuples, such as tuple_3) in a buffer. The size of that buffer may be a factor in specifying the point at which the downstream operator assumes a tuple is lost and sends a request to the upstream operator to re-send the lost tuple. In this regard, the post-gap tuples held in the buffer must not overflow the buffer. In one or more other embodiments, the downstream operator may assume a tuple is lost and send a request to the upstream operator to re-send the lost tuple immediately upon finding a gap in the sequence of tuples.

In accordance with one or more embodiments in which order processing is requested, when the downstream operator assumes a tuple is lost and sends a request to the upstream operator to re-send the lost tuple, the buffer of the downstream operator will hold all following tuple flow (i.e., post-gap tuples) until the lost tuple comes in or a lost tuple criteria is reached. The downstream operator, in accordance with one or more embodiments, may send one or more additional requests (retries) to the upstream operator to re-send the lost tuple. The lost tuple criteria may, for example, be a period of time or specify a maximum number of retries that be attempted. Once the lost tuple criteria is reached, the downstream operator will signal an error, which may require user intervention.

On the other hand, in accordance with one or more embodiments in which order processing is not requested, the downstream operator will not wait to receive the lost tuple, and can immediately process all following tuple flow (i.e., post-gap tuples). However, this immediate processing of all following tuple flow may be subject to an integrity processing operation, if requested. That is, in accordance with one or more embodiments in which order processing is not requested but integrity processing is requested, the downstream operator may check whether any tuple(s) in the tuple flow (i.e., post-gap tuples) is/are corrupt (rather than immediately process all following tuple flow). For example, the downstream operator may verify that each tuple received in all following tuple flow (i.e., post-gap tuples) is not corrupt by recalculating the hash of data contained in the received tuple, comparing the recalculated hash of data contained in the received tuple and the tuple-data hash within the mark on the received tuple, and finding a match between the recalculated hash of data contained in the received tuple and the tuple-data hash within the mark on the received tuple.

The lost tuple will be processed when it is received. If the lost tuple is not received, the downstream operator may keep sending the request to the upstream operator to re-send the lost tuple, if necessary, until the downstream operator receives the lost tuple or until a lost tuple criteria is reached. For example, the lost tuple criteria may be a period of time or specify a maximum number of retries that may be attempted. Once the lost tuple criteria is reached, the downstream operator may signal an error, which may require user intervention.

Likewise, the correct version of a corrupt tuple will be processed when it is received. If the correct version of a corrupt tuple is not received, the downstream operator may keep sending the request to the upstream operator to re-send the tuple, if necessary, until the downstream operator receives the correct version of the corrupt tuple or until a corrupt tuple criteria is reached. For example, the corrupt tuple criteria may be a period of time or specify a maximum number of retries that may be attempted. Once the corrupt tuple criteria is reached, the downstream operator may signal an error, which may require user intervention.

In accordance with one or more embodiments, the upstream operator will store a "history of tuples" in its buffer (history period is pre-determined and configurable), in case the upstream operator needs to re-send a tuple based on a downstream operator request. For example, the upstream operator may keep the "history of tuples" in its buffer until a handshake is established between the upstream operator and the downstream operator relative to tuple status. If, for example, the upstream operator's buffer is full or becoming full, the upstream operator may determine which tuples can be purged by querying the downstream operator as to which tuples the downstream operator has received. In another example, if the downstream operator requests the upstream operator to re-send a lost tuple, the upstream operator may purge tuples that the downstream operator received.

FIG. 1 illustrates one exemplary computing infrastructure 100 that may be configured to execute a stream computing application, according to one or more embodiments. The computing infrastructure 100 includes a management system 105 and two or more compute nodes 110A-110F, which are communicatively coupled to each other using one or more communications networks 120. The communications network 120 may include one or more servers, networks, or databases, and may use a particular communications protocol to transfer data between the compute nodes 110A-110F. A compiler system 115 may be communicatively coupled with the management system 105 and the compute nodes 110A-110F, either directly or via the communications network 120.

The management system 105 includes an operator graph 132 and a stream manager 134. The operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes 110A-110F, as well as to change the structure of the operator graph 132. The stream manager 134 may move processing elements (PEs) from one compute node 110 to another, for example, to manage the processing loads of the compute nodes 110 in the computing infrastructure 100. Further, the stream manager 134 may control the stream computing application by inserting, removing, fusing, un-fusing, or otherwise modifying the processing elements (or what datatuples flow to the processing elements) running on the compute nodes 110A-110F. One example of a stream computing application is IBM® InfoSphere® Streams, available from International Business Machines Corporation. IBM® and InfoSphere® are registered trademarks of International Business Machines Corporation ("IBM") in the United States.

The compiler system 115 includes a compiler 136. The compiler 136 compiles modules, which include source code or statements, into the object code, which includes machine instructions that execute on a processor.

Figure 2:
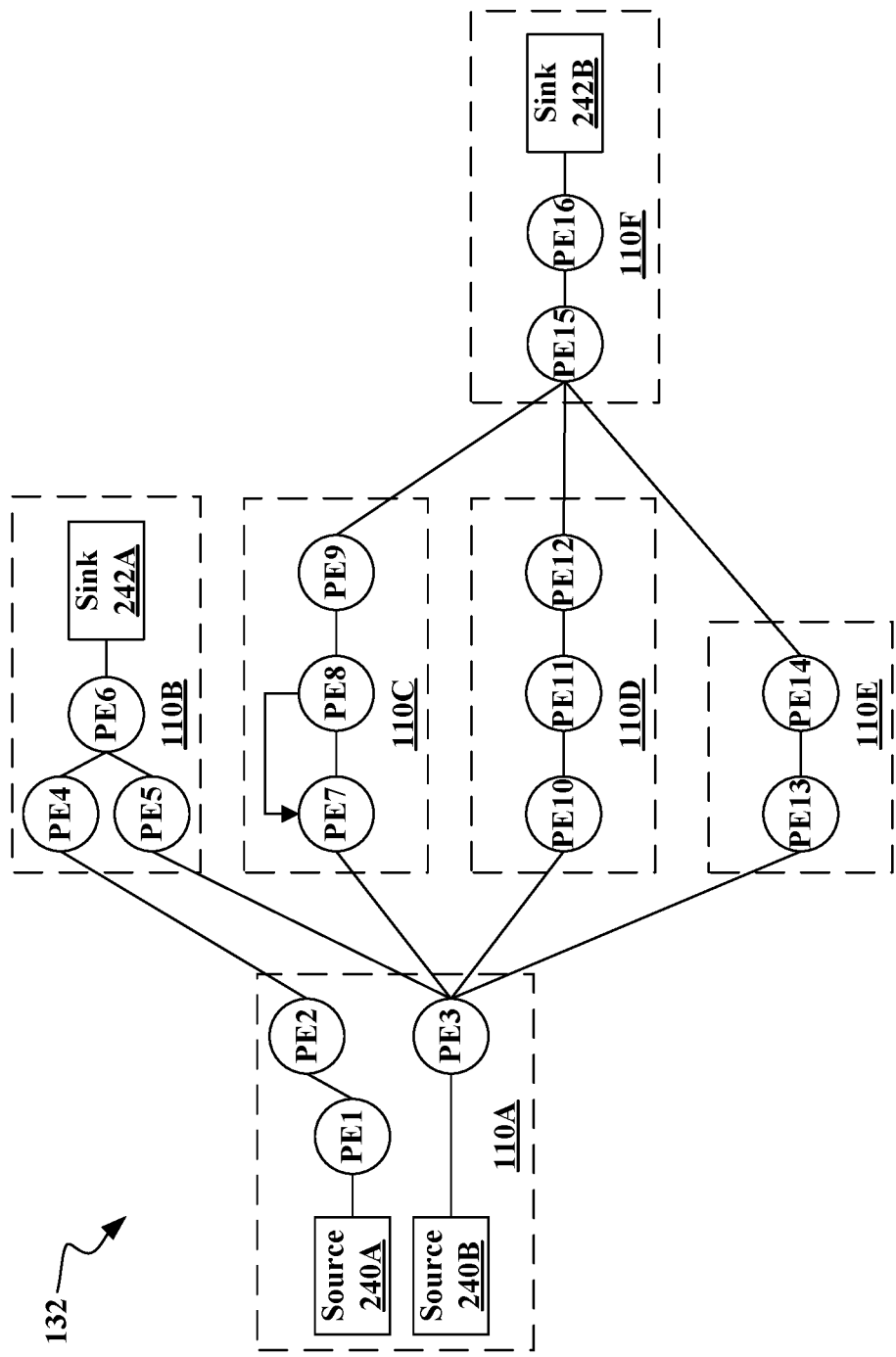
FIG. 2 is a block diagram illustrating an operator graph for a stream computing application, according to one or more embodiments.

FIG. 2 illustrates an example operator graph 132 that includes sixteen processing elements (labeled as PE1-PE16) running on the compute nodes 110A-110F. Of note, because a processing element is a collection of fused operators, it is equally correct to describe the operator graph as execution paths between specific operators, which may include execution paths to different operators within the same processing element. FIG. 2 illustrates execution paths between processing elements for the sake of clarity. While a single operator within a processing element may be executed as an independently running process with its own process ID (PID) and memory space, multiple operators may also be fused together into a processing element to run as a single process (with a PID and memory space). In cases where two (or more) operators are running in independent processing elements, inter-process communication may occur using a "transport" (e.g., a network socket, a TCP/IP socket, or shared memory). However, when operators are fused together, the operators within a processing element can use more rapid communication techniques for passing tuples (or other data) between the operators.

As shown, the operator graph 132 begins at sources 240A and 240B (that flow into the processing elements labeled as PE1 and PE3, respectively) and ends at sinks 242A and 242B (that flow from the processing elements labeled as PE6 and PE16, respectively). Compute node 110A includes the processing elements PE1, PE2 and PE3. Compute node 110B includes the processing elements PE4, PE5 and PE6. Compute node 110C includes the processing elements PE7, PE8 and PE9. Compute node 110D includes processing elements PE10, PE11, and PE12. Compute node 110E includes processing elements PE13 and PE14. Compute node 110F includes processing elements PE15 and PE16.

Source 240A flows into the processing element PE1, which in turn emits tuples that are received by PE2. Source 240B flows into the processing element PE3, which in turn emits tuples that are received by processing elements PE5, PE7, PE10, and PE13. Of note, although the operators within the processing elements are not shown in FIG. 2, in some embodiments the data tuples flow between operators within the processing elements rather than between the processing elements themselves. For example, one or more operators within processing element PE3 may split data attributes received in a tuple and pass some data attributes to one or more other operators within processing element PE5, while passing other data attributes to one or more additional operators within processing elements PE7, PE10, and PE13.

Data that flows to processing element PE2 is processed by the operators contained in processing element PE2, and the resulting tuples are then emitted to processing element PE4 on compute node 110B. Likewise, the data tuples emitted by processing element PE4 flow to sink PE6 242A. Similarly, data tuples flowing from processing elements PE3 to PE5 (i.e., from operator(s) within processing element PE3 to operator(s) within processing element PE5) also reach sink PE6 242A. Thus, in addition to being a sink for this example operator graph, the processing element PE6 could be configured to perform a join operation, combining tuples received from processing elements PE4 and PE5.

This example operator graph also shows data tuples flowing from processing elements PE3 to PE7 on compute node 110C, which itself shows data tuples flowing to processing element PE8 and looping back to processing element PE7. Data tuples emitted from processing element PE8 flow to processing element PE9. Data tuples emitted from processing element PE9 flow to processing element PE15 on compute node 110F, which in turn emits tuples to be processed by sink PE16 242B.

Further, this example operator graph shows data tuples flowing from processing element PE3 to processing element PE10 on compute node 110D, which itself shows data tuples flowing to processing element PE11. Data tuples emitted from processing element PE11 flow to processing element PE12. Data tuples emitted from processing element PE12 flow to processing element PE15 on compute node 110F, which in turn emits tuples to be processed by sink PE16 242B.

Still further, this example operator graph shows data tuples flowing from processing element PE3 to processing element PE13 on compute node 110E, which itself shows data tuples flowing to processing element PE14. Data tuples emitted from processing element PE14 flow to processing element PE15 on compute node 110F, which in turn emits tuples to be processed by sink PE16 242B.

Of note, in this example operator graph, the processing elements PE 6 and PE15 are multiple input port processing elements, i.e., processing element PE6 has two input ports that respectively receive data tuples from processing elements PE4 and PE5, while processing element PE15 has three input ports that respectively receive data tuples from processing elements PE9, PE12, and PE14. Thus, as mentioned above, in addition to being a sink for this example operator graph, processing element PE6 could be configured to perform a join operation, combining tuples received from processing elements PE4 and PE5. Similarly, processing element PE15 could be configured to perform a join operation, combining tuples received from processing elements PE9, PE12 and PE14.

Figure 3:
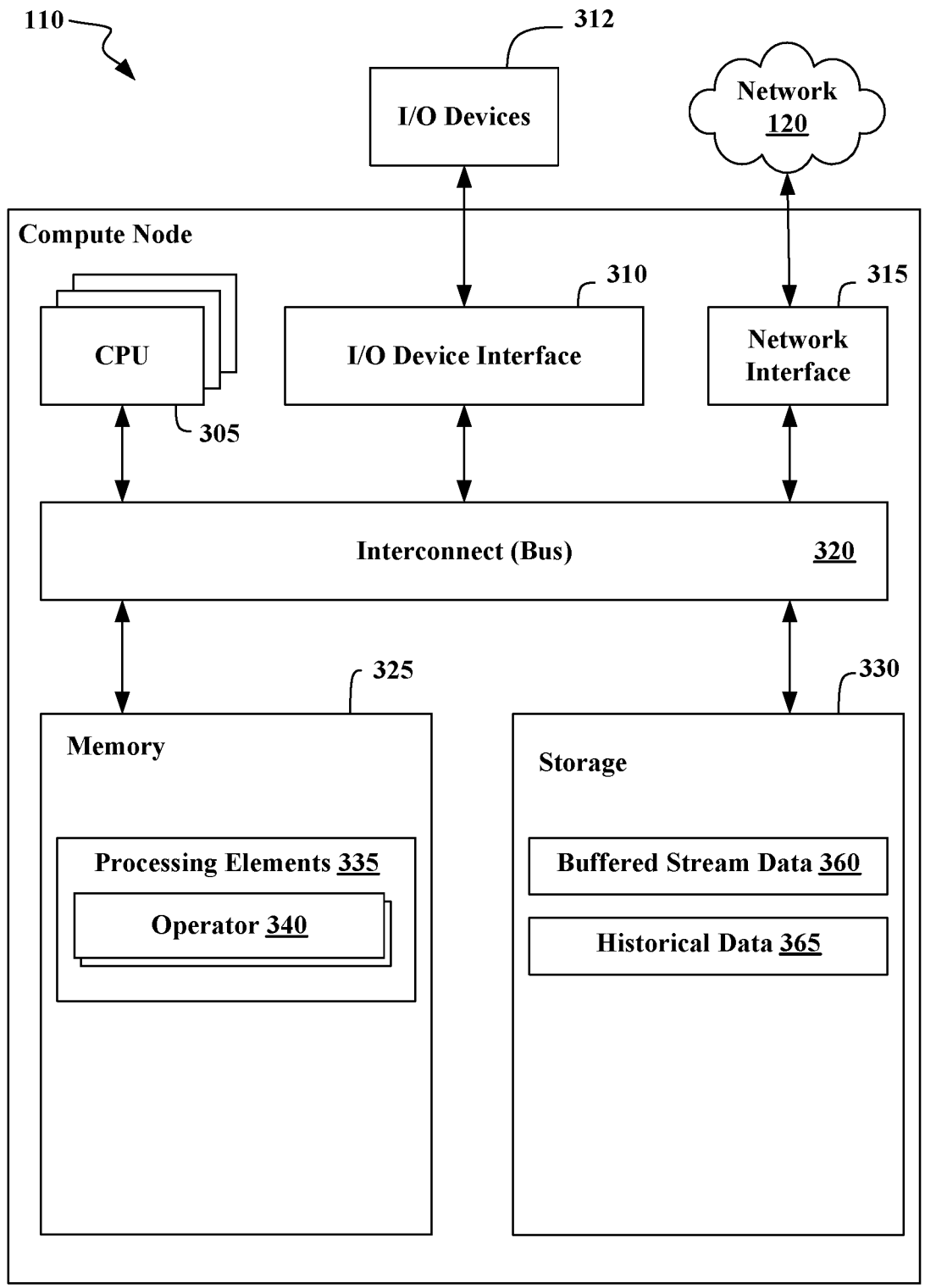
FIG. 3 is a block diagram illustrating, in a more detailed view, the compute node of FIGS. 1 and 2, according to one or more embodiments.

FIG. 3 is a more detailed view of the compute node 110 of FIGS. 1 and 2, according to one or more embodiments. As shown, the compute node 110 includes, without limitation, at least one CPU 305, a network interface 315, an interconnect 320, a memory 325, and storage 330. The compute node 130 may also include an I/O device interface 310 used to connect I/O devices 312 (e.g., keyboard, display and mouse devices) to the compute node 110.

Each CPU 305 retrieves and executes programming instructions stored in the memory 325 and storage 330. Similarly, the CPU 305 stores and retrieves application data residing in the memory 325 and storage 330. The interconnect 320 is used to transmit programming instructions and application data between each CPU 305, I/O device interface 310, network interface 315, memory 325, and storage 330. CPU 305 is included to be representative of a single CPU, multiple CPUs, a single CPU having multiple processing cores, and the like. In one or more embodiments, a processing element (PE) 335 is assigned to be executed by only one CPU 305 although in other embodiments the operators 340 of a PE 335 may comprise one or more threads that are executed on a plurality of CPUs 305. The memory 325 is generally included to be representative of a random access memory (e.g., DRAM or Flash). Storage 330, such as a hard disk drive, solid state disk (SSD), or flash memory storage drive, may store non-volatile data.

In this example, the memory 325 includes a plurality of processing elements 335. The processing elements 335 include a collection of operators 340. As noted above, each operator 340 may provide a small chunk of code configured to process data flowing into a processing element (e.g., PE 335) and to emit data to other operators 340 in that PE and to other processing elements in the stream computing application. In the context of the present disclosure, a plurality of operators 340 may be fused in a processing element 335, such that all of the operators 340 are encapsulated in a single process running on the compute node 110. For example, each operator 340 could be implemented as a separate thread, such that all of the operators 340 can be run in parallel within a single process. The processing elements may be on the same compute node 110 or on other compute nodes accessible over the data communications network 120. Memory 325 may also contain stream connection data (not shown) which represents the connections between PEs on compute node 110 (e.g., a TCP/IP socket connection between two separate PEs 335), as well as connections to other compute nodes 110 with upstream and/or downstream PEs in the stream computing application, also via TCP/IP sockets (or other inter-process data communication mechanisms).

In accordance with one or more embodiments in which one of the operators 340 is an entry operator, the entry operator includes code configured to mark each tuple going through a consistent region (e.g., operation 612 in FIG. 6, described below) or other region that guarantees no lost tuples and/or guarantees no corrupt tuples.

Generally, as noted above, a particular tuple output by a processing element may not be considered the same tuple as a corresponding input tuple even if the input tuple is not changed by the processing element. Accordingly, each operator that outputs tuples into a consistent region (or other region that guarantees no lost tuples and/or guarantees no corrupt tuples) may constitute an entry operator and may mark each tuple that it outputs into the consistent region (or other region that guarantees no lost tuples and/or guarantees no corrupt tuples).

In accordance with one or more embodiments in which one or more of the operators 340 is a downstream operator, if order processing is requested, each downstream operator includes code configured to perform an order processing operation (e.g., 1012 in FIGS. 10 and 11, described below).

In accordance with one or more embodiments in which one or more of the operators 340 is a downstream operator, if integrity processing is requested, each downstream operator includes code configured to perform an integrity processing operation (e.g., 1016 in FIGS. 10 and 12, described below).

As shown, storage 330 contains buffered stream data 360 and historical data 365. The buffered stream data 360 represents a storage space for data flowing into the compute node 110 from upstream processing elements (or from a data source for the stream computing application). For example, buffered stream data 360 may include data tuples waiting to be processed by one of the PEs 335—i.e., a buffer. In accordance with one or more embodiments in which one or more of the operators 340 of the compute node 110 is a downstream operator, if order processing is requested, when the downstream operator determines it has received a tuple out of order, the downstream operator will store all following tuple flow (i.e., post-gap tuples) received by the downstream operator in its buffer (e.g., a portion of storage 330 allocated to the downstream operator's buffered stream data 360) until the lost tuple comes in or a lost tuple criteria is reached. Buffered stream data 360 may also store the results of data processing performed by processing elements 335 that will be sent to downstream processing elements. For example, a PE 335 may have to store tuples intended for a downstream PE 335 if that PE 335 already has a full buffer, which may occur when the operator graph is experiencing backpressure.

Storage may also contain historical data 365, which represents previous output values from the various processing elements 335 in the stream computing application. Such historical data 365 could be used, for instance, to re-send a lost tuple or corrupt tuple. In accordance with one or more embodiments in which one or more of the operators 340 of the compute node 110 is an upstream operator, historical data 365 will include a "history of tuples" in case the upstream operator needs to re-send a tuple based on a downstream operator request. For example, the upstream operator may store the "history of tuples" in its buffer (e.g., a portion of storage 330 allocated to the upstream operator's historical data 365) until a handshake is established between the upstream operator and a downstream operator relative to tuple status. If, for example, the upstream operator's buffer is full or becoming full, the upstream operator may determine which tuples can be purged by querying the downstream operator as to which tuples the downstream operator has received. In another example, if the downstream operator requests the upstream operator to re-send a lost tuple, the upstream operator may purge tuples that the downstream operator received.

Figure 4:
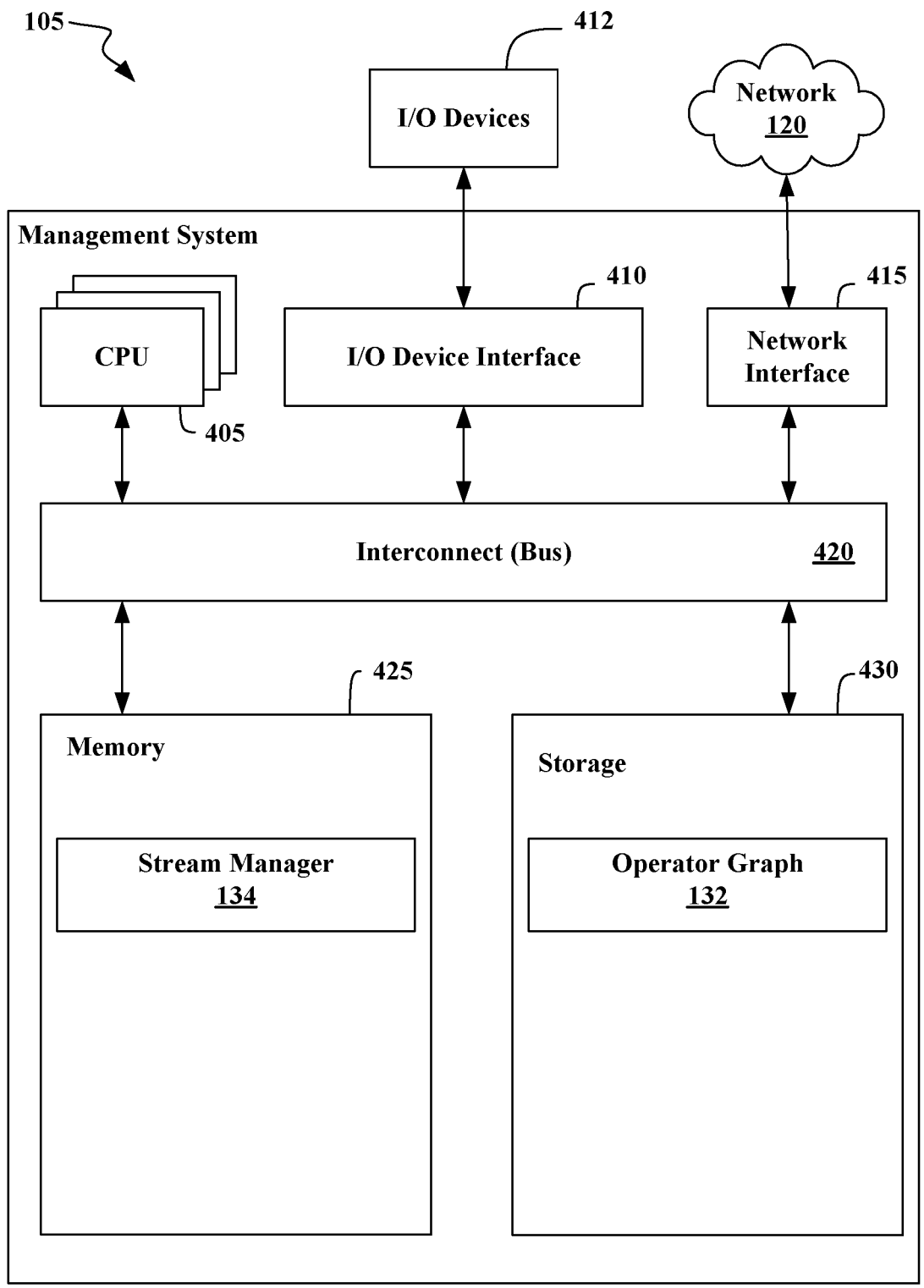
FIG. 4 is a block diagram illustrating, in a more detailed view, the management system of FIG. 1, according to one or more embodiments.

FIG. 4 is a more detailed view of the management system 105 of FIG. 1, according to some embodiments of the present invention. As shown, management system 105 includes, without limitation, a CPU 405, a network interface 415, an interconnect 420, a memory 425, and storage 430. The management system 105 may also include an I/O device interface 410 connecting I/O devices 412 (e.g., keyboard, display, and mouse devices) to the management system 105.

Like CPU 305 of FIG. 3, CPU 405 is configured to retrieve and execute programming instructions stored in the memory 425 and storage 430. Similarly, the CPU 405 is configured to store and retrieve application data residing in the memory 425 and storage 430. The interconnect 420 is configured to move data, such as programming instructions and application data, between the CPU 405, I/O device interface 410, network interface 415, memory 425, and storage 430. Like CPU 305, CPU 405 is included to be representative of a single CPU, multiple CPUs, a single CPU having multiple processing cores, and the like. Memory 425 is generally included to be representative of a random access memory. The network interface 415 is configured to transmit data via the communications network 120. Although shown as a single unit, the storage 430 may be a combination of fixed and/or removable storage devices, such as fixed disc drives, removable memory cards, optical storage, SSD or flash memory devices, network attached storage (NAS), or connections to storage area-network (SAN) devices.

As shown, the memory 425 stores a stream manager 134. Additionally, the storage 430 includes an operator graph 132. The stream manager 134 may use the operator graph 132 to route tuples to PEs 335 (shown in FIG. 3) for processing.

Figure 5:
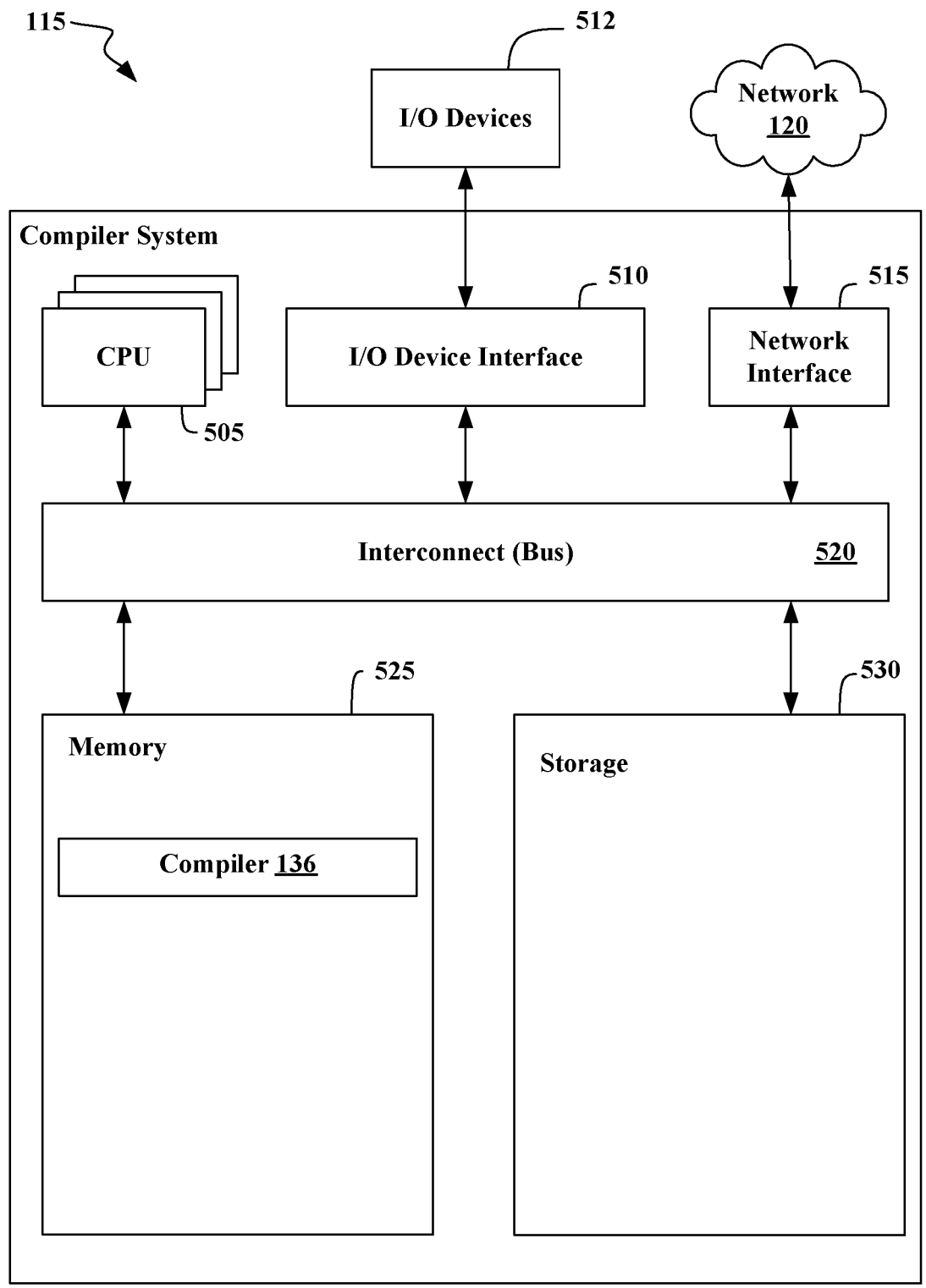
FIG. 5 is a block diagram illustrating, in a more detailed view, the compiler system of FIG. 1, according to one or more embodiments.

FIG. 5 is a more detailed view of the compiling system 115 of FIG. 1, according to some embodiments of the present invention. The compiler system 115 may include, without limitation, one or more processors (CPUs) 505, a network interface 515, an interconnect 520, a memory 525, and storage 530. The compiler system 115 may also include an I/O device interface 510 connecting I/O devices 512 (e. g., keyboard, display, and mouse devices) to the compiler system 115.

Each CPU 505 retrieves and executes programming instructions stored in the memory 525 or storage 530. Similarly, each CPU 505 stores and retrieves application data residing in the memory 525 or storage 530. The interconnect 520 is used to move data, such as programming instructions and application data, between the CPU 505, I/O device interface 510, network interface 515, memory 525, and storage 530. The interconnect 520 may be one or more busses. The CPUs 505 may be a single CPU, multiple CPUs, or a single CPU having multiple processing cores in various embodiments. In one embodiment, a processor 505 may be a DSP. Memory 525 is generally included to be representative of a random access memory, e.g., SRAM, DRAM or Flash. The storage 530 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 515 is configured to transmit data via the communications network 120.

The memory 525 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In various embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 6:
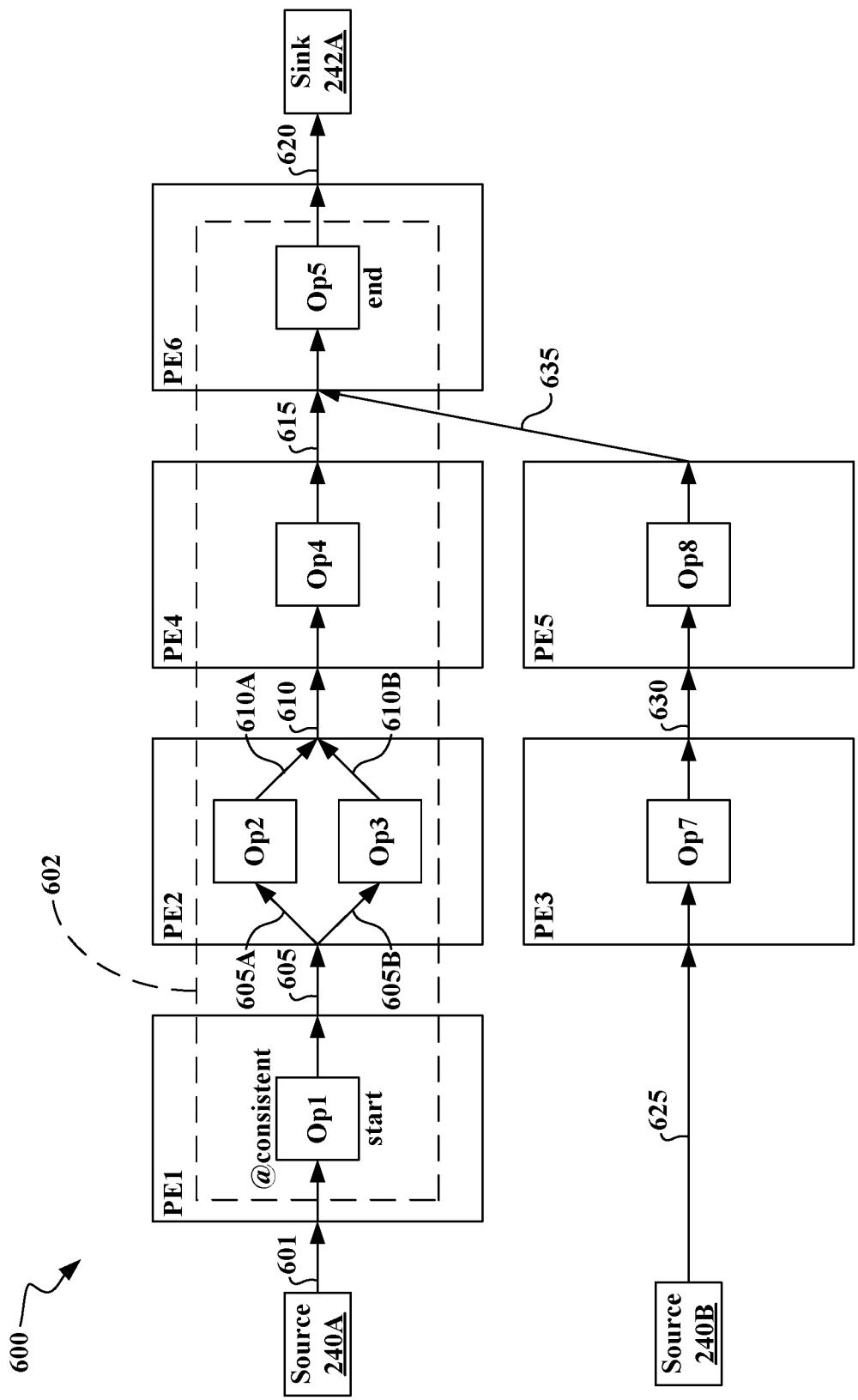
FIG. 6 is a block diagram illustrating operator-to-operator data flow in a portion of the data stream of FIG. 2, according to one or more embodiments.

FIG. 6 illustrates operator-to-operator data flow 600 in a portion of the data stream of FIG. 2, according to one or more embodiments. The data stream illustrated in FIG. 6 includes a consistent region 602, described below.

In the data stream illustrated in FIG. 6, the PE-to-PE data flow may be an abstraction of data flows between the individual operators in the operator graph. For example, Operator_1 (denoted Op1 in FIG. 6) in processing element PE1 sends tuples to Operator_2 and Operator_3 (denoted Op2 and Op3, respectively, in FIG. 6) in processing element PE2 along the data paths 605A and 605B, collectively referred to as a PE-to-PE data path 605. Similarly, operators Op2 and Op3 in processing element PE2 transmit the processed tuples to Operator_4 (denoted Op4 in FIG. 6) in processing element PE4 along the data paths 610A and 610B, collectively referred to as a PE-to-PE data path 610.

Source 240A flows tuples along data path 601 into operator Op1 in processing element PE1, which in turn emits tuples along data path 605 into operators Op2 and Op3 in processing element PE2. Tuples that flow to operators Op2 and Op3 in processing element PE2 are processed by those operators, and the resulting tuples are then emitted along data path 610 to operator Op4 in processing element PE4. Likewise, the tuples emitted by operator Op4 in processing element PE4 flow along data path 615 to Operator_5 (denoted Op5 in FIG. 6) in processing element PE6. As described below, operator Op5 in processing element PE6 also receives, along data path 635, tuples emitted by Operator_8 (denoted Op 8 in FIG. 6) in processing element PE5. Finally, the tuples emitted by operator Op5 in processing element PE6 reach sink 242A along data path 620.

Source 240B flows tuples along data path 625 into Operator_7 (denoted Op7 in FIG. 6) in processing element PE3, which in turn emits tuples along data path 630 into operator Op8 in processing element PE5. Tuples emitted by operator Op8 in processing element PE5 flow along data path 635 to operator Op5 in processing element PE6. As described above, operator Op5 in processing element PE6 also receives, along data path 615, tuples emitted by operator Op4 in processing element PE4. Finally, the tuples emitted by operator Op5 in processing element PE6 reach sink 242A along data path 620.

At this point, it is helpful to briefly discuss the use of consistent regions in stream processing applications. A stream processing application can be defined with zero, one, or more consistent regions using advanced computing platforms, such as IBM® Streams, that enable the development and execution of applications that process information in data streams. IBM® is a registered trademark of International Business Machines Corporation ("IBM") in the United States. A consistent region is a subgraph where the states of the operators become consistent by processing all the tuples and punctuation marks within defined points on a stream. This enables tuples within the subgraph to be processed at least once. The consistent region is periodically drained of its current tuples. All tuples in the consistent region are processed through to the end of the subgraph. In advanced computing platforms, such as IBM® Streams, in-memory state of operators are automatically serialized and stored on checkpoint for each of the operators in the consistent region.

If any operator in a consistent region fails at run time, an advanced computing platform, such as IBM® Streams, detects the failure and triggers the restart of the operators and reset of the consistent region. In-memory state of operators are automatically reloaded, and deserialized on reset of the operators.

A Job Control Plane operator is added to each application that includes a consistent region to coordinate control information between operators. The Job Control Plane operator provides a mechanism within an application to control operators and to enable coordination between operators. This coordination allows a set of operators in a consistent region to achieve at-least-once processing. Specifically, the Job Control Plane operator controls the submission of notifications to drain and reset the set of operators that are included in a consistent region. The Job Control Plane operator does not have any stream connections to other operators in the application. Rather, the Job Control Plane operator implicitly exchanges control information with other operators. The Job Control Plane operator has no input or output ports and appears as a stand-alone operator in an application graph.

The capability to drain the subgraph, which is coupled with start operators that can replay their output streams, enables a consistent region to achieve at-least-once processing.

The start of a consistent region is defined with the @consistent annotation on an operator making it a start operator. In the example illustrated in FIG. 6, the start of the consistent region 602 is defined with the @consistent annotation on the operator Op1, making operator Op1 the start of the consistent region 602. The @consistent operator can be applied to either a primitive operator or a composite operator. When the @consistent annotation is applied to a primitive operator, the annotation indicates that the operator and the reachability graph of the operator participate in a consistent region. When the @consistent annotation is applied to a composite operator, the annotation indicates that the composite operator and the reachability graph of the composite operator participate in a single consistent region.

For example, a primitive operator that is annotated with the @consistent annotation (e.g., operator Op1 in the example illustrated in FIG. 6) is considered the start operator of the consistent region. The reachability graph of an operator is made up of any other operator that the start operator reaches through all its outgoing stream connections, which means all the connections of all the output ports. The scope of the consistent region can be reduced, however, using the @autonomous annotation. In the example illustrated in FIG. 6, operators Op2, Op3, Op4, and Op5 are in the reachability graph, and operator Op5 is an end operator of the consistent region 602. In the example illustrated in FIG. 6, operators Op7 and Op8 are not in the reachability graph.

An advanced computing platform, such as IBM® Streams, determines the scope of consistent region automatically.

Figure 7:
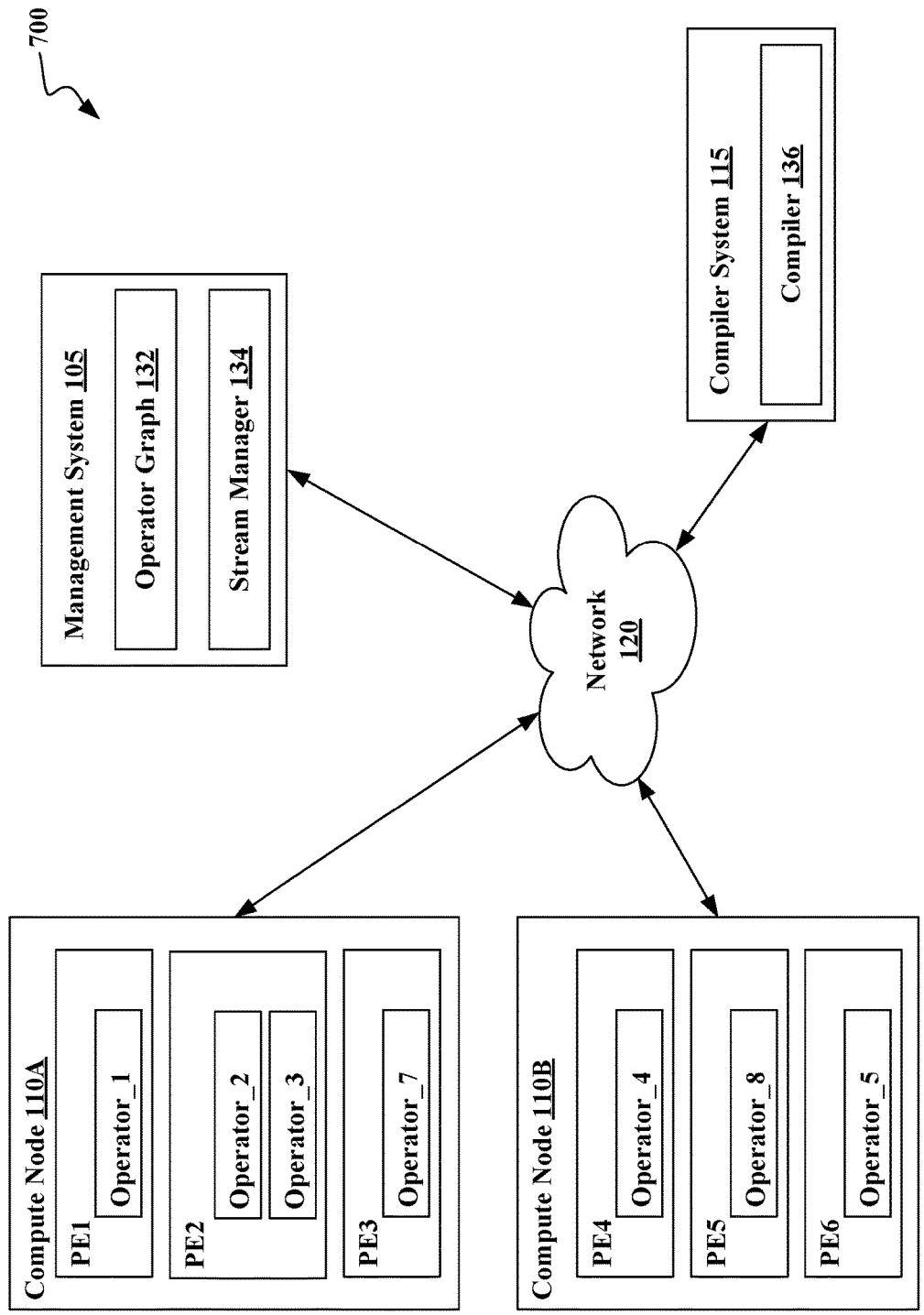
FIG. 7 is a block diagram illustrating a stream computing environment configured to provide the operator-to-operator data flow illustrated in FIG. 6 in a portion of the data stream of FIG. 2, according to one or more embodiments.

FIG. 7 illustrates a stream computing environment configured to provide the operator-to-operator data flow illustrated in FIG. 6 in a portion of the data stream of FIG. 2, according to one or more embodiments. More specifically, the stream computing environment illustrated in FIG. 7 includes a portion of the data stream of FIG. 2 that includes the consistent region 602 illustrated in FIG. 6. As shown, the system 700 includes a management system 105, a compiler system 115, and two compute nodes 110A and 110B, interconnected via a network 120. Also as shown, the management system 105 contains an operator graph 132 and a stream manager 134. Also as shown, the compiler system 115 includes a compiler 136. These components illustrated in FIG. 7 may correspond to the components illustrated in FIG. 1 with like designations.

In the embodiment depicted in FIG. 7, consistent with the operator graph 132 illustrated in FIG. 2, the compute node 110A contains processing elements PE1, PE2, and PE3, and the compute node 110B contains processing elements PE4, PE5, and PE6.

Also, in the embodiment depicted in FIG. 7, consistent with the operator-to-operator data flow 600 illustrated in FIG. 6, the processing element PE1 contains the Operator_1, the processing element PE2 contains the Operator_2 and the Operator_3, the processing element PE3 contains the Operator_7, the processing element PE4 contains the Operator_4, the processing element PE 5 contains the Operator_8, and the processing element PE6 contains the Operator_5.

Figure 8:
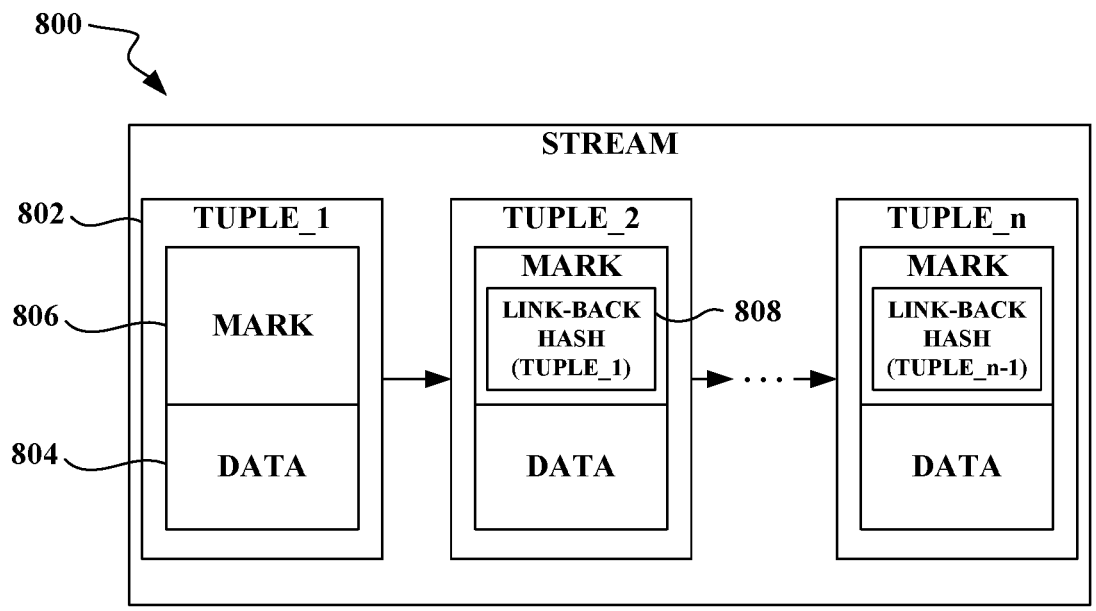
FIG. 8 is a block diagram illustrating a data stream including a sequence of tuples, according to one or more embodiments.

FIG. 8 illustrates a data stream 800 including a sequence of tuples 802 (e.g., Tuple_1, Tuple_2, . . . Tuple_n), according to one or more embodiments. Each tuple 802 is a data structure that includes data 804 representing a sequence of one or more attributes associated with an entity. Attributes may be any of a variety of different types, e.g., integer, float, Boolean, string, etc. The attributes may be ordered. A tuple 802 may be extended by adding one or more additional attributes to it. In addition to attributes associated with an entity, a tuple 804 may include metadata, i.e., data about the tuple 802. Although the data stream 800 is illustrated in FIG. 8 as including a sequence of tuples 804, this example is illustrative and not limiting. One skilled in the art will appreciate a "stream" or "data stream", in accordance to one or more embodiments, may refer to other data formats (e.g., data marked up as XML documents). In the context of tuples, the stream 800 may be considered a pseudo-infinite sequence of tuples 804.

Figure 9:
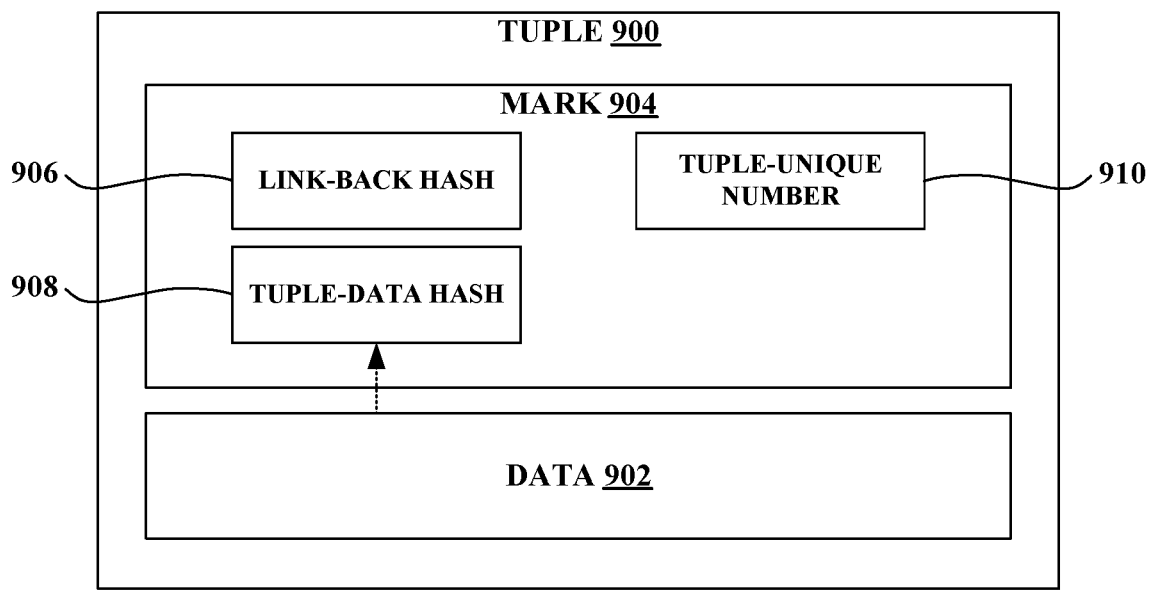
FIG. 9 is block diagram illustrating a tuple including a mark, according to one or more embodiments.

As described above, the entry operator of a consistent region, in accordance with one or more embodiments, will place a mark 806 on each tuple 802 going through the consistent region. For example, the entry operator may extend each tuple 802 going through the consistent region by adding the mark 806. An illustrative data structure of each tuple 802 including the mark 806 is illustrated in FIG. 9, described below. For example, in accordance with one or more embodiments, the mark 806 placed on each tuple by the entry operator may include a link-back hash 808. The link-back hash 808 within the mark 806 on a tuple 802 is a link to the immediately preceding tuple 802 (e.g., the link-back hash 808 within the mark 806 on a tuple 802 may be a hash of the concatenation of a tuple-unique number (910 in FIG. 9, described below) within the mark 806 on the immediately preceding tuple 802 and data 804 contained in the immediately preceding tuple 802). For example, the link-back hash 808 within the mark 806 on Tuple_2 may be a hash of the concatenation of a tuple-unique number (910 in FIG. 9, described below) within the mark 806 on Tuple_1 and data 804 contained in Tuple_1. Likewise, the link-back hash 808 within the mark 806 on Tuple_n may be a hash of the concatenation of a tuple-unique number (910 in FIG. 9, described below) within the mark 806 on Tuple_n−1 and data 804 contained in Tuple_n−1.

FIG. 9 illustrating a tuple 900 including data 902 and a mark 904, according to one or more embodiments. In accordance with one or more embodiments, the mark 904, which is placed on each tuple 900 going through a consistent region by the consistent region's entry operator, includes a link-back hash 906, a tuple-data hash 908, and a tuple-unique number 910. In accordance with one or more embodiments, the mark 904 of a tuple 900, once set, will not change in the lifecycle of the tuple 900. The tuple 900, the data 902, the mark 904, and the link-back hash 906 illustrated in FIG. 9 may correspond to the tuple 802, the data 804, the mark 806, and the link-back hash 808 illustrated in FIG. 8.

The link-back hash 906 within a mark 904 on a tuple 900 is a link to the immediately preceding tuple 900. In accordance with one or more embodiments, the link-back hash 906 within the mark 904 on a tuple 900 (e.g., Tuple_2 in FIG. 8) may be a hash of the concatenation of the tuple-unique number 910 within the mark 904 on the immediately preceding tuple 900 (e.g., Tuple_1 in FIG. 8) and data 902 contained in the immediately preceding tuple 900 (e.g., Tuple_1 in FIG. 8). For example, the entry operator of a consistent region may, in accordance with one or more embodiments, sequentially for each tuple 900 going through the consistent region, calculate a hash of the concatenation of the tuple-unique number 910 within the mark 904 on the tuple 900 (e.g., Tuple_1 in FIG. 8) and data 902 contained in the tuple 900 (e.g., Tuple_1 in FIG. 8) and include the calculated hash as the link-back hash 906 within the mark 904 it places on the next tuple (e.g., Tuple_2 in FIG. 8).

The tuple-data hash 908 within a mark 904 on a tuple 900 is a hash of data 902 contained in the tuple 900. For example, the entry operator of a consistent region may, in accordance with one or more embodiments, for each tuple 900 going through the consistent region, calculate a hash of data 902 contained in the tuple 900 and include the calculated hash as the tuple-data hash 908 within the mark 904 it places on the tuple 900. In accordance with one or more embodiments, the tuple-data hash 908 within the mark 904 on a tuple 900 may be the Merkle root of attributes, metadata, etc. that make up the data 902 contained in the tuple 900.

The tuple-unique number 910 within a mark 904 on a tuple 900 is a timestamp, sequence number, or other unique number that uniquely identifies the tuple 900 from other tuples 900 within the data steam. For example, the entry operator of a consistent region, in accordance with one or more embodiments, may include a timestamp as the tuple-unique number 910 within the mark 904 it places on each tuple 900 going through the consistent region, the timestamp representing the point in time when the entry operator sends the tuple 900. Assuming the entry operator sends each tuple 900 through the consistent region in sequence, each tuple 900 within the data stream would be numbered sequentially by the timestamps. In another example, the entry operator of a consistent region, in accordance with one or more embodiments, may include a sequence number as the tuple-unique number 910 within the mark 904 it places on each tuple 900 going through the consistent region. Assuming the entry operator marks each tuple 900 in sequence, each tuple 900 within the data stream would be numbered sequentially by the sequence numbers. The sequence numbers may, for example, start from a fixed value (e.g., Tuple_1) or a "randomly" selected value.

Figure 10:
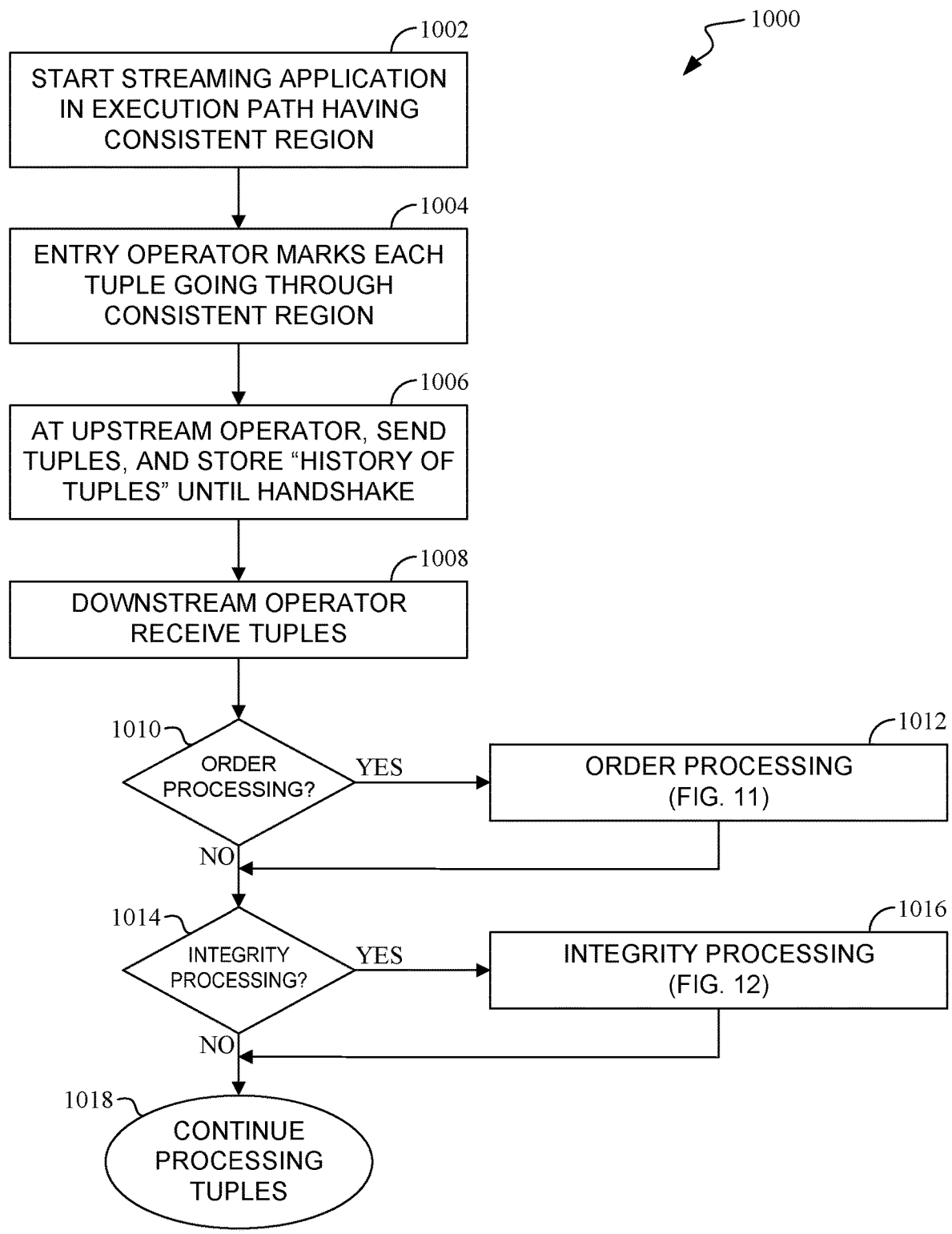
FIG. 10 is a flow diagram of an illustrative method to guarantee no tuple loss and/or no tuple corruption in a real-time data streaming environment, according to one or more embodiments.

FIG. 10 is a flow diagram of an illustrative method 1000 to guarantee no tuple loss and/or no tuple corruption in a real-time data streaming environment, according to one or more embodiments. The method 1000 sets forth the preferred order of the blocks. It must be understood, however, that the various blocks may occur at any time relative to one another. The method 1000 begins by starting a streaming application in an execution path having a consistent region (block 1002). For example, referring temporarily back to FIG. 6, a steaming application may be started in an execution path having the consistent region 602.

The method 1000 continues with the entry operator of the consistent region marking each tuple going through the consistent region (block 1004). For example, referring temporarily back to FIG. 6, operator Op1 (which is the start operator of the consistent region 602) may place a mark on each tuple going through the consistent region 602. The entry operator may, for example, extend each tuple going through the consistent region by adding a mark that includes a link-back hash, a tuple-data hash, and a tuple-unique number. With regard to the link-back hash, the entry operator may, sequentially for each tuple going through the consistent region, calculate a hash of the concatenation of the tuple-unique number within the mark on the tuple and data contained in the tuple and include the calculated hash as the link-back hash within the mark it places on the next-in-sequence tuple. With regard to the tuple-data hash, the entry operator may, for each tuple going through the consistent region, calculate a hash of data contained in the tuple and include the calculated hash as the tuple-data hash within the mark it places on the tuple. With regard to the tuple-unique number, the entry operator may, for each tuple going through the consistent region, include a timestamp as the tuple-unique number within the mark it places on each tuple going through the consistent region, the timestamp representing the point in time when the entry operator sends the tuple.

Next, the method 1000 continues with an upstream operator sending tuples through the consistent region, and storing a "history of tuples" until a handshake is established with one or more downstream operators relative to tuple status (block 1006). For example, referring temporarily back to FIG. 6, an upstream operator (e.g., operator Op1) may send in sequence the tuples going through the consistent region 602, and store a "history of tuples" until a handshake is established between the upstream operator (e.g., operator Op1) and one or more downstream operators (e.g., operator Op2 and/or operator Op3) relative to tuple status. For example, temporarily referring back to FIG. 3, the upstream operator 340 may store the "history of tuples" in its buffer (e.g., a portion of storage 330 allocated to the upstream operator's historical data 365) until a handshake is established between the upstream operator 340 and the downstream operator 340 relative to tuple status. If, for example, the upstream operator's buffer is full or becoming full, the upstream operator may determine which tuples can be purged by querying the downstream operator as to which tuples the downstream operator has received. In another example, if the downstream operator requests the upstream operator to re-send a lost tuple, the upstream operator may purge tuples that the downstream operator received.

Then the method 1000 continues with the downstream operator receiving tuples sent by the upstream operator through the consistent region (block 1008). For example, referring temporarily back to FIG. 6, the "downstream" operators Op2 and Op3 receive tuples sent by the "upstream" operator Op1, the "downstream" operator Op4 receives tuples sent by the "upstream" operators Op2 and Op3, and the "downstream" operator Op5 receives tuples sent by the "upstream" operator Op4.

The method 1000 then continues with the downstream operator determining whether order processing is requested (block 1010). In accordance with one or more embodiments, the stream computing application designates the operator(s) in which order processing is to be performed. The user may, in accordance with one or more embodiments, alter the stream computing application by modifying the operator(s) in which order processing is to be performed. Order processing guarantees tuples are processed by sequence.

If the downstream operator determines that order processing is requested (block 1010=yes), the method 1000 continues by performing order processing (block 1012). An illustrative order processing operation 1012 is shown in FIG. 11. After order processing is successfully performed, the method 1000 continues with the downstream operator determining whether integrity processing is requested (step 1014, described below).

If, on the other hand, the downstream operator determines that order processing is not requested (block 1010=no), the method 1000 continues with the downstream operator determining whether integrity processing is requested (block 1014). In accordance with one or more embodiments, the stream computing application designates the operator(s) in which integrity processing is to be performed. The user may, in accordance with one or more embodiments, alter the stream computing application by modifying the operator(s) in which integrity processing is to be performed. Integrity processing check for and recognizes corruption to the tuple.

If the downstream operator determines that integrity processing is requested (block 1014=yes), the method 1000 continues by performing integrity processing (block 1016). An illustrative integrity processing operation 1016 is shown in FIG. 12. After integrity processing is successfully performed, the method 1000 continues with the downstream operator continuing processing tuples (step 1018, described below).

If, on the other hand, the downstream operator determines that order processing is not requested (block 1014=no), the method 1000 continues with the downstream operator continuing processing tuples (block 1018, described below).

In block 1018, the downstream operator continues processing tuples as appropriate based on successful completion of order processing (if requested) and/or successful completion of integrity processing (if requested). For example, in response to successful completion of order processing (without integrity processing), one or more tuples may be processed by the downstream operator including any tuple(s) received in order, any lost tuple(s) received, and any held tuples released from the downstream operator's buffer. In response to successful completion of integrity processing (without order processing), one or more tuples may be processed by the downstream operator including any tuple(s) received without corruption/malicious changes, and any new tuple(s) received to replace corrupt tuple(s). In response to successful completion of both order processing and integrity processing, one or more tuples may be processed by the downstream operator including any tuple(s) received in order, any lost tuple(s) received, any held tuples released from the downstream operator's buffer, any tuple(s) received without corruption/malicious changes, and any new tuple(s) received to replace corrupt tuple(s).

Figure 11:
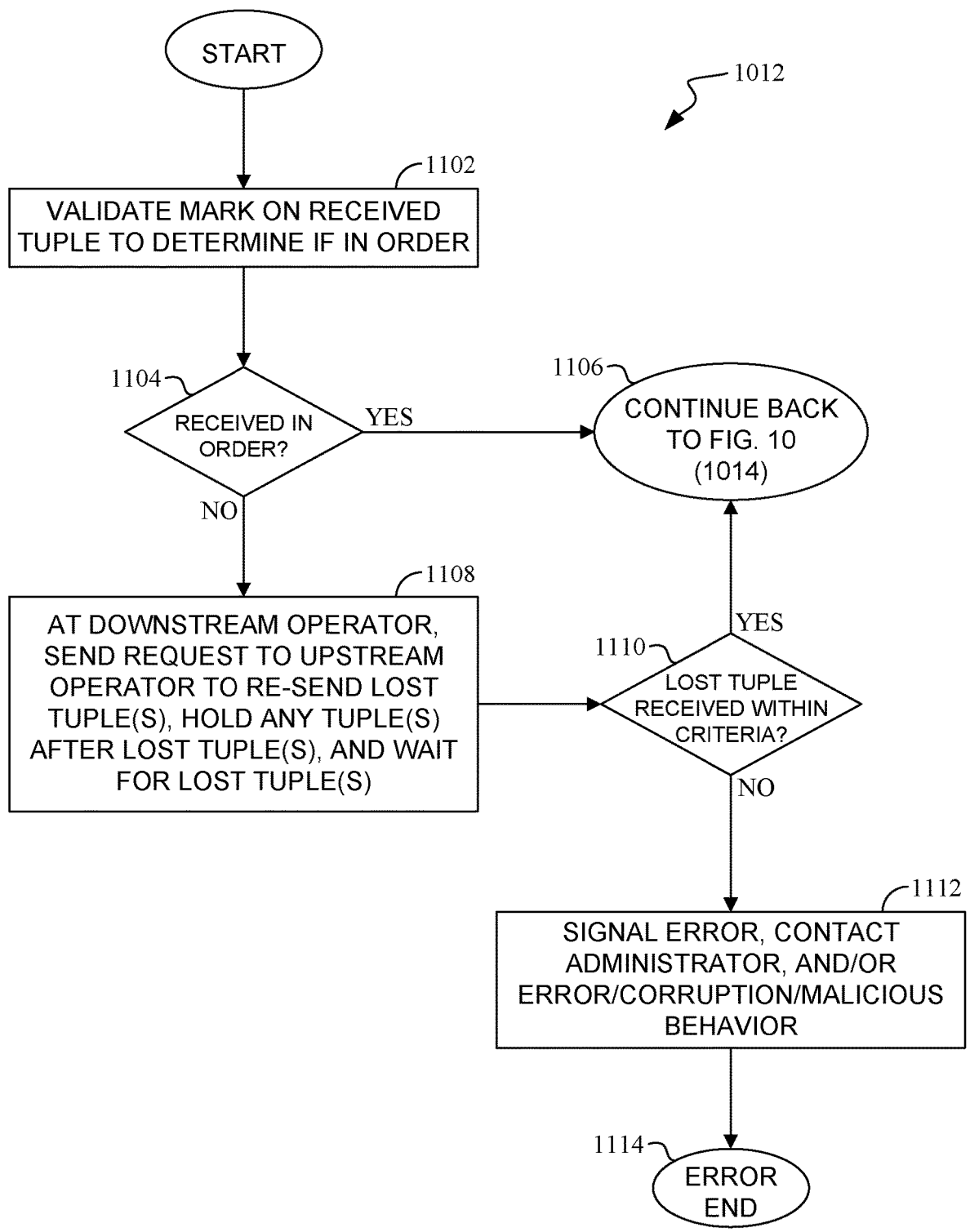
FIG. 11 is a flow diagram of an illustrative order processing operation performed in the method of FIG. 10, according to one or more embodiments.

FIG. 11 is a flow diagram of an illustrative order processing operation 1012 performed in the method of FIG. 10, according to one or more embodiments. The order processing operation 1012 sets forth the preferred order of the blocks. It must be understood, however, that the various blocks may occur at any time relative to one another.

The order processing operation 1012 begins with the downstream operator validating the mark on a received tuple to determine if the received tuple was received in order (block 1102). For example, the downstream operator may receive a tuple_n and subsequently receive a tuple_n+1. The downstream operator may validate the mark on the tuple_n+1 to determine if the tuple_n+1 was received in order by calculating a hash of the tuple_n (i.e., a hash of the concatenation of the tuple-unique number within the mark on the tuple_n and data contained in the tuple_n), and comparing the calculated hash of the tuple_n and the link-back hash within the mark on the tuple_n+1.

The order processing operation 1012 continues with the downstream operator determining whether the received tuple was received in order (block 1104). For example, if the link-back hash within the mark on the tuple_n+1 is identical to the calculated hash of the tuple_n, then the tuple_n+1 was received in order (i.e., no tuples in the stream of tuples between tuple_n and tuple_n+1 have been "lost"). On the other hand, if the link-back hash within the mark on the tuple_n+1 is different than the calculated hash of the tuple_n, then the tuple_n+1 was not received in order (e.g., one or more tuples in the stream of tuples between tuple_n and tuple_n+1 may have been "lost").

If the downstream operator determines the received tuple was received in order (block 1104=yes), the order processing operation 1012 returns (block 1106) to the method 1000 of FIG. 10 with the downstream operator determining whether integrity processing is requested (block 1014 in FIG. 10, described above). If the tuple arrived in order at the downstream operator (i.e., this is a succeeding case, and will occur most of the time), the downstream operator can be sure that the tuple was not preceded in the stream of tuples by a lost tuple. In this case, the tuple can be processed (block 1018 in FIG. 10, described above) without waiting (although processing of the tuple may first be subject to an integrity processing operation (block 1016 in FIG. 10, described above), if requested).

If, on the other hand, the downstream operator determines the received tuple was not received in order (block 1104=no), the order processing operation 1012 continues with the downstream operator sending a request to the upstream operator to re-send the lost tuple(s), holding any tuples(s) after the lost tuple(s), and waiting for the lost tuple(s) (block 1108). The request to re-send the lost tuple(s) sent to the upstream operator by the downstream operator may, for example, identify tuples that were received by the downstream operator. For example, the request to re-send the lost tuple(s) may identify a pre-gap tuple (i.e., the tuple received by the downstream operator immediately before the gap) and a post-gap tuple (i.e., the tuple received by the downstream operator immediately after the gap) from which the upstream operator may determine which tuple(s) to re-send. The pre-gap tuple and the post-gap tuple may be identified in the request to re-send the lost tuple(s) by, for example, their respective marks.

In block 1108, the downstream operator assumes one or more tuple(s) is/are lost and sends a request to re-send the lost tuple(s) immediately upon finding a gap in the sequence of tuples (i.e., there is a gap in the sequence of tuples, e.g., the downstream operator receives tuple_1 and subsequently receives tuple_3 but does not receive tuple_2). In other embodiments, the downstream operator may wait a certain amount of time (pre-defined and configurable) and/or a certain buffer limit before assuming one or more tuple(s) is/are lost and sending a request to re-send the lost tuple(s).

In block 1108, the downstream operator holds any tuple(s) after the lost tuple(s) (i.e., post-gap tuples) in the downstream operator's buffer until the lost tuple(s) comes/come in (block 1110=yes, described below) or a lost tuple criteria is reached (block 1110=no, described below). In block 1108, the downstream operator may send one or more additional requests (retries) to the upstream operator to re-send the lost tuple(s). The lost tuple criteria may, for example, be a period of time or specify a maximum number of retries that be attempted.

Next, the order processing operation 1012 continues with the downstream operator determining whether the lost tuple(s) have been received within the lost tuple criteria (block 1110).

If the downstream operator determines the lost tuple(s) have been received within the lost tuple criteria (block 1110=yes), the order processing operation 1012 returns (block 1106) to the method 1000 of FIG. 10 with the downstream operator determining whether integrity processing is requested (block 1014 in FIG. 10, described above). If the lost tuple(s) have been received at the downstream operator, as validated by the mark on the lost tuple(s), the lost tuple(s) and any held tuples released from the downstream operator's buffer can be processed (block 1018 in FIG. 10, described above) without waiting (although processing of the lost tuple(s) and any held tuples released from the downstream operator's buffer may first be subject to an integrity processing operation (block 1016 in FIG. 10, described above), if requested).

If, on the other hand, the downstream operator determines the lost tuple(s) have not been received within the lost tuple criteria (block 1110=no), the order processing operation 1012 continues with the downstream operator signaling an error, contacting an administrator, and/or error/corruption/malicious behavior (block 1112). User intervention may be required to correct a communications problem, for example, or address a malicious behavior issue. The order processing operation 1012 then ends (block 1114).

Figure 12:
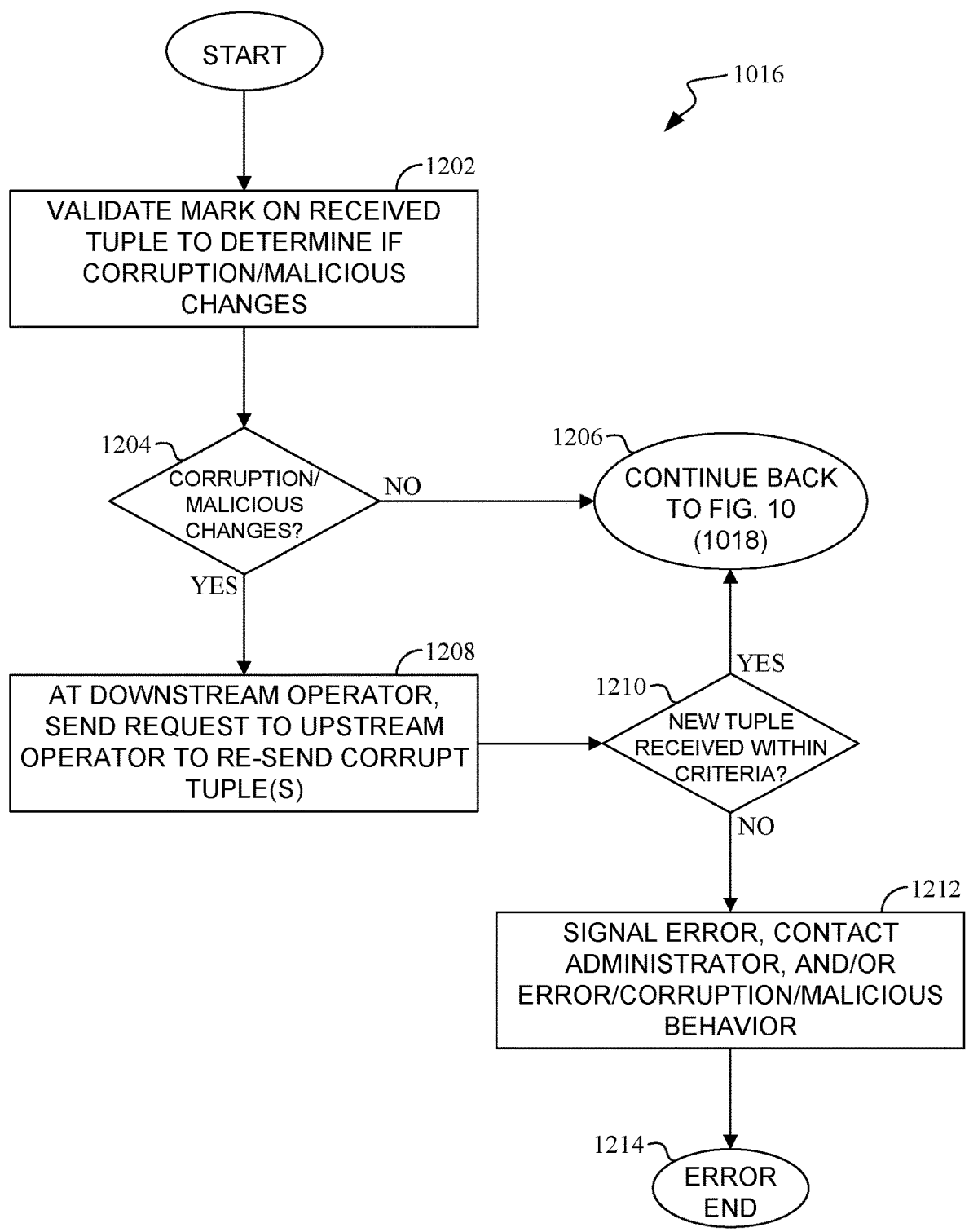
FIG. 12 is a flow diagram of an illustrative integrity processing operation performed in the method of FIG. 10, according to one or more embodiments.

FIG. 12 is a flow diagram of an illustrative integrity processing operation 1016 performed in the method of FIG. 10, according to one or more embodiments. The integrity processing operation 1016 sets forth the preferred order of the blocks. It must be understood, however, that the various blocks may occur at any time relative to one another.

The integrity processing operation 1016 begins with the downstream operator validating the mark on a received tuple to determine if the received tuple was received with corruption and/or malicious changes (block 1202). For example, the downstream operator may determine if a received tuple was received with corruption/malicious changes by recalculating the hash of data contained in the received tuple, and comparing the recalculated hash of data contained in the received tuple and the tuple-data hash within the mark on the received tuple.

The integrity processing operation 1016 continues with the downstream operator determining whether the received tuple was received with corruption/malicious changes (block 1204). For example, if the recalculated hash of data contained in the received tuple is identical to the tuple-data hash within the mark on the received tuple, then the received tuple was received without corruption/malicious changes. On the other hand, if the recalculated hash of data contained in the received tuple is different than the tuple-data hash within the mark on the received tuple, then the received tuple was received with corruption/malicious changes.

If the downstream operator determines the received tuple was received without corruption/malicious changes (block 1204=no), the integrity processing operation 1016 returns (block 1206) to the method 1000 of FIG. 10 with the downstream operator continuing to process tuples (block 1018 in FIG. 10, described above). In this case, the received tuple can be processed (block 1018 in FIG. 10, described above) without waiting.

If, on the other hand, the downstream operator determines the received tuple was received with corruption/malicious changes (block 1204=no), the integrity processing operation 1016 continues with the downstream operator sending a request to the upstream operator to re-send the corrupt tuple(s) (block 1208). The request to re-send the corrupt tuple sent to the upstream operator by the downstream operator may, for example, identify the corrupt tuple, itself, and/or a tuple immediately before the corrupt tuple that was received without corruption/malicious changes by the downstream operator. For example, the request to re-send the corrupt tuple may identify a leading tuple (i.e., the tuple received without corruption/malicious changes by the downstream operator immediately before the corrupt tuple) from which the upstream operator may determine which tuple to re-send. The corrupt tuple and the leading tuple may be identified in the request to re-send the corrupt tuple by, for example, their respective marks.

In block 1208, the downstream operator may send one or more additional requests (retries) to the upstream operator to re-send the corrupt tuples until the new tuple comes in (block 1210=yes, described below) or a corrupt tuple criteria is reached (block 1210=no, described below). The corrupt tuple criteria may, for example, be a period of time or specify a maximum number of retries that be attempted.

Next, the integrity processing operation 1016 continues with the downstream operator determining whether the new tuple has been received within the corrupt tuple criteria (block 1210).

If the downstream operator determines the new tuple has been received within the corrupt tuple criteria (block 1210=yes), the integrity processing operation 1016 returns (block 1206) to the method 1000 of FIG. 10 with the downstream operator continuing to process tuples (block 1018 in FIG. 10, described above). If the new tuple has been received without corruption/malicious changes at the downstream operator, as validated by the mark on the new tuple, the new tuple can be processed (block 1018 in FIG. 10, described above) without waiting.

If, on the other hand, the downstream operator determines the new tuple has not been received within the corrupt tuple criteria (block 1210=no), the integrity processing operation 1016 continues with the downstream operator signaling an error, contacting an administrator, and/or error/corruption/malicious behavior (block 1212). User intervention may be required to correct a communications problem, for example, or address a malicious behavior issue. The integrity processing operation 1016 then ends (block 1214).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet)

One skilled in the art will appreciate that many variations are possible within the scope of the present invention. For example, although embodiments of the present invention are described within the context of a method, system, and computer program product to guarantee no tuple loss and/or no tuple corruption in a real-time data streaming environment, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, some embodiments of the present invention may be configured to operate on an as-needed basis, with different levels of order processing and/or integrity processing (e.g., ranging from occasional, spot checking to checking every tuple to guarantee no tuple loss and/or no tuple corruption) based on various criteria such as current conditions, historical data, level of service, data importance, and the like. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A method comprising:
   sending a stream of tuples from an entry operator to one or more downstream operators, wherein the stream of tuples includes a sequence of a first tuple, followed by a second tuple, followed by one or more subsequent tuples, wherein sending a stream of tuples from an entry operator to one or more downstream operators includes sending the stream of tuples through a consistent region, and wherein the consistent region is defined by an annotation applied to the entry operator and a reachability graph of the entry operator;
   placing, at the entry operator, a mark on each tuple in the stream of tuples, wherein the mark comprises a tuple-unique number and a tuple-data hash of data contained in the tuple, and wherein the mark on the second tuple and each of the one or more subsequent tuples further comprises a link-back hash associated with an immediately preceding tuple in the stream of tuples.

2. The method as recited in claim 1, wherein the tuple-unique number includes a timestamp.

3. The method as recited in claim 1, wherein the tuple-unique number includes a sequence number.

4. The method as recited in claim 1, wherein the link-back hash associated with the immediately preceding tuple in the stream of tuples is a hash of a concatenation of the tuple-unique number within the mark on the immediately preceding tuple and data contained in the immediately preceding tuple.

5. The method as recited in claim 1, wherein the tuple-data hash is a Merkle root of data contained in the tuple.

6. The method as recited in claim 1, further comprising:
checking, at the one or more downstream operators, whether one or more received tuples is/are received out of order.

7. The method as recited in claim 6, wherein checking, at the one or more downstream operators, whether one or more received tuples is/are received out of order comprises:
calculating a hash of a tuple_n received at the one or more downstream operators, wherein calculating the hash of the tuple_n includes calculating a hash of a concatenation of the tuple-unique number within the mark on the tuple_n and data contained in the tuple_n;
comparing the calculated hash of the tuple_n and the link-back hash within the mark on a tuple_n+1 subsequently received at the one or more downstream operators.

8. The method as recited in claim 7, further comprising:
determining, at the one or more downstream operators, that a lost tuple exists between the tuple_n and the tuple_n+1 in response to finding a mismatch between the calculated hash of the tuple_n and the link-back hash within the mark on the tuple_n+1;
sending, from the one or more downstream operators, a request for the entry operator to re-send the lost tuple.

9. The method as recited in claim 8, further comprising:
holding, at the one or more downstream operators, the tuple_n+1 until the lost tuple is received by the one or more downstream operators in response to sending the request for the entry operator to re-send the lost tuple, wherein the tuple_n+1 is held unprocessed at the one or more downstream operators until the lost tuple is received.

10. The method as recited in claim 7, further comprising:
processing, at the one or more downstream operators, the tuple_n+1 in response to finding a match between the calculated hash of the tuple_n and the link-back hash within the mark on the tuple_n+1.

11. The method as recited in claim 1, further comprising:
checking, at the one or more downstream operators, whether one or more received tuples is/are corrupt.

12. The method as recited in claim 11, wherein checking, at the one or more downstream operators, whether one or more received tuples is/are corrupt comprises:
calculating a hash of data contained in a tuple received at the one or more downstream operators;
comparing the calculated hash of data contained in the received tuple and the tuple-data hash within the mark on the received tuple.

13. A computer system, comprising:
one or more compute nodes, each having a processor, a memory, and a bus that couples various compute node components including the memory to the processor, the computer system configured to perform a method comprising:
sending a stream of tuples from an entry operator to one or more downstream operators, wherein the stream of tuples includes a sequence of a first tuple, followed by a second tuple, followed by one or more subsequent tuples;
placing, at the entry operator, a mark on each tuple in the stream of tuples, wherein the mark comprises a tuple-unique number and a tuple-data hash of data contained in the tuple, and wherein the mark on the second tuple and each of the one or more subsequent tuples further comprises a link-back hash associated with an immediately preceding tuple in the stream of tuples;
checking, at the one or more downstream operators, whether one or more received tuples is/are received out of order, the checking operation comprising:
calculating a hash of a tuple_n received at the one or more downstream operators, wherein calculating the hash of the tuple_n includes calculating a hash of a concatenation of the tuple-unique number within the mark on the tuple_n and data contained in the tuple_n;
comparing the calculated hash of the tuple_n and the link-back hash within the mark on a tuple_n+1 subsequently received at the one or more downstream operators.

14. The computer system as recited in claim 13, wherein the method further comprises:
checking, at the one or more downstream operators, whether one or more received tuples is/are corrupt, the checking operation comprising:
calculating a hash of data contained in a tuple received at the one or more downstream operators;
comparing the calculated hash of data contained in the received tuple and the tuple-data hash within the mark on the received tuple.

15. A computer program product to guarantee no tuple loss and/or no tuple corruption in a real-time data streaming environment in a computer system having one or more compute nodes, each compute node having a processor, a memory, and a bus that couples various compute node components including the memory to the processor, the computer program product comprising a non-transitory computer readable storage medium having program code embodied therewith, the program code executable by the processor of at least one of the one or more compute nodes, to perform a method comprising:
sending a stream of tuples from an entry operator to one or more downstream operators, wherein the stream of tuples includes a sequence of a first tuple, followed by a second tuple, followed by one or more subsequent tuples;
placing, at the entry operator, a mark on each tuple in the stream of tuples, wherein the mark comprises a tuple-unique number and a tuple-data hash of data contained in the tuple, and wherein the mark on the second tuple and each of the one or more subsequent tuples further comprises a link-back hash associated with an immediately preceding tuple in the stream of tuples;
checking, at the one or more downstream operators, whether one or more received tuples is/are received out of order, the checking operation comprising:
calculating a hash of a tuple_n received at the one or more downstream operators, wherein calculating the hash of the tuple_n includes calculating a hash of a concatenation of the tuple-unique number within the mark on the tuple_n and data contained in the tuple_n;

comparing the calculated hash of the tuple_n and the link-back hash within the mark on a tuple_n+1 subsequently received at the one or more downstream operators.

16. The computer program product as recited in claim 15, wherein the method further comprises:

checking, at the one or more downstream operators, whether one or more received tuples is/are corrupt, the checking operation comprising:

calculating a hash of data contained in a tuple received at the one or more downstream operators;

comparing the calculated hash of data contained in the received tuple and the tuple-data hash within the mark on the received tuple.

* * * * *